(12) United States Patent
Kim et al.

(10) Patent No.: US 11,366,563 B2
(45) Date of Patent: Jun. 21, 2022

(54) ELECTRONIC DEVICE AND METHOD FOR INDUCING INPUT

(71) Applicant: Samsung Electronics Co., Ltd., Gyeonggi-do (KR)

(72) Inventors: Wankyu Kim, Gyeonggi-do (KR); Jooyoung Kang, Gyeonggi-do (KR); Sangeun Lee, Gyeonggi-do (KR); Raetae Kim, Gyeonggi-do (KR); Youngseong Kim, Gyeonggi-do (KR); Gyeongtae Park, Gyeonggi-do (KR); Hyunju Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/329,299

(22) Filed: May 25, 2021

(65) Prior Publication Data

US 2022/0113842 A1    Apr. 14, 2022

(30) Foreign Application Priority Data

Oct. 13, 2020    (KR) .......................... 10-2020-0131973

(51) Int. Cl.
*G06F 3/048*    (2013.01)
*G06F 3/0481*    (2022.01)
(Continued)

(52) U.S. Cl.
CPC .......... *G06F 3/0481* (2013.01); *G06F 1/1624* (2013.01); *G06F 1/1652* (2013.01);
(Continued)

(58) Field of Classification Search
CPC .... G06F 3/0481; G06F 1/1694; G06F 1/1624; G06F 1/1652; G06F 3/016;
(Continued)

(56) References Cited

U.S. PATENT DOCUMENTS 5,690,317 A * 11/1997 Sandsborg ................ E06B 9/08
160/300
5,710,576 A *  1/1998 Nishiyama ........... G08B 3/1058
345/169
(Continued)

FOREIGN PATENT DOCUMENTS

JP    2009110286 A    5/2009
KR    10-2015-0077774 A    7/2015
(Continued)

OTHER PUBLICATIONS

Korean Notice of Preliminary Examination Results dated Feb. 8, 2021.

(Continued)

*Primary Examiner* — Steven B Theriault
(74) *Attorney, Agent, or Firm* — Cha & Reiter, LLC

(57) ABSTRACT

An electronic device and method are disclosed. The electronic device includes a first sub-housing, and a second sub-housing, a flexible, a sensor, and a processor. The processor implements the method, including detecting a first input, obtaining a first value from the first input, when the first value is equal to or greater than a first reference value, detecting a second input following the first input, displaying a first graphical user interface element in response to the second input, obtaining a second value from the second input, when the second value is less than a second reference value, displaying the first GUI element on the display based on the second value, and when the second value is equal to or greater than the second reference value, displaying a second GUI element on the flexible display, wherein the second housing is moved to extend a display area.

17 Claims, 16 Drawing Sheets

(51) Int. Cl.
*G06F 3/01* (2006.01)
*G06F 3/16* (2006.01)
*G06F 1/16* (2006.01)
*G06F 3/041* (2006.01)

(52) U.S. Cl.
CPC ............ *G06F 1/1694* (2013.01); *G06F 3/016* (2013.01); *G06F 3/167* (2013.01); *G06F 3/041* (2013.01); *G06F 2203/04102* (2013.01)

(58) Field of Classification Search
CPC ........... G06F 2203/04102; G06F 3/017; G06F 3/0416; G06F 3/041; G06F 2203/04105; G06F 1/1656; G06F 3/04144; G06F 3/147; G06F 3/04847; G06F 3/04842; G06F 2203/04104; G06F 3/038
See application file for complete search history.

(56) References Cited

U.S. PATENT DOCUMENTS

| | | | | |
|---|---|---|---|---|
| 6,671,011 B1* | 12/2003 | Zhang | G06F 1/1601 | 349/12 |
| 6,748,249 B1* | 6/2004 | Eromaki | H04M 1/0247 | 455/575.4 |
| 6,993,128 B2* | 1/2006 | Eromaki | H04M 1/0237 | 379/433.12 |
| 7,136,688 B2* | 11/2006 | Jung | H04M 1/0237 | 455/575.4 |
| 7,292,882 B2* | 11/2007 | Lee | H04B 1/3805 | 455/575.4 |
| 7,952,566 B2* | 5/2011 | Poupyrev | G06F 3/03547 | 345/173 |
| 8,294,018 B2* | 10/2012 | Wang | G06F 3/044 | 84/615 |
| 8,587,542 B2* | 11/2013 | Moore | G06F 3/04883 | 345/173 |
| 8,711,566 B2* | 4/2014 | O'Brien | G06F 1/1624 | 361/724 |
| 8,818,468 B2* | 8/2014 | Matsuo | H04M 1/0245 | 455/575.4 |
| 9,086,755 B2* | 7/2015 | Cho | G06F 3/0416 | |
| 9,141,259 B2* | 9/2015 | Bell | G06F 3/0488 | |
| 9,195,272 B2 | 11/2015 | O'Brien | | |
| 9,244,562 B1* | 1/2016 | Rosenberg | G06F 3/045 | |
| 9,262,002 B2* | 2/2016 | Momeyer | G06F 3/0485 | |
| 9,383,820 B2* | 7/2016 | Fleizach | H04M 1/724 | |
| 9,612,741 B2* | 4/2017 | Brown | G06F 3/04883 | |
| 9,639,204 B2* | 5/2017 | Kim | G06F 3/0445 | |
| 9,830,010 B2 | 11/2017 | Jeon et al. | | |
| 9,910,494 B2* | 3/2018 | Westerman | G06F 3/016 | |
| 10,019,435 B2* | 7/2018 | Ouyang | G06F 40/274 | |
| 10,067,653 B2* | 9/2018 | Kocienda | G06F 3/0488 | |
| 10,095,396 B2* | 10/2018 | Kudurshian | G06F 3/016 | |
| 10,126,854 B2* | 11/2018 | Johansson | G06F 3/04186 | |
| 10,168,886 B2* | 1/2019 | Kim | G06F 3/0488 | |
| 10,338,732 B2* | 7/2019 | Lee | G06F 3/0488 | |
| 10,346,020 B2* | 7/2019 | Chirogene | G06F 3/016 | |
| 10,424,272 B2* | 9/2019 | Yoon | G06F 3/0488 | |
| 10,429,932 B2* | 10/2019 | Kwon | G06F 3/016 | |
| 10,499,515 B2* | 12/2019 | Lee | H05K 1/028 | |
| 10,572,084 B2* | 2/2020 | Kim | G06F 21/32 | |
| 10,627,994 B2* | 4/2020 | Seo | G06F 3/0482 | |
| 10,691,172 B2* | 6/2020 | Jovanovic | G09F 9/00 | |
| 10,732,805 B2* | 8/2020 | Kim | G06F 3/04842 | |
| 10,827,046 B1* | 11/2020 | Li | G06F 1/1624 | |
| 10,868,897 B2* | 12/2020 | Cha | H04M 1/0268 | |
| 10,880,417 B1* | 12/2020 | Song | H04M 1/0237 | |
| 10,891,033 B2* | 1/2021 | Mannby | G06F 3/0488 | |
| 10,936,017 B2* | 3/2021 | Choi | G06F 1/1643 | |
| 10,937,393 B2* | 3/2021 | Lee | G09G 3/035 | |
| 10,955,876 B1* | 3/2021 | Song | H04M 1/0268 | |
| 10,963,016 B2* | 3/2021 | Oh | G06F 1/1626 | |
| 10,976,775 B1* | 4/2021 | Cha | H05K 7/1401 | |
| 11,029,732 B2* | 6/2021 | Ahn | G06F 1/1652 | |
| 11,036,384 B2* | 6/2021 | Yoon | G06F 3/0488 | |
| 11,051,413 B2* | 6/2021 | Yang | H05K 5/0017 | |
| 11,071,218 B2* | 7/2021 | Wittenberg | H05K 5/0217 | |
| D926,718 S * | 8/2021 | Lee | D14/138 AD | |
| 11,106,245 B2* | 8/2021 | Shim | G06F 1/1652 | |
| 2002/0062317 A1 | 5/2002 | Wakai et al. | | |
| 2005/0070348 A1* | 3/2005 | Lee | H04M 1/0245 | 455/575.4 |
| 2006/0050018 A1* | 3/2006 | Hutzel | B60R 1/12 | 345/60 |
| 2006/0132455 A1* | 6/2006 | Rimas-Ribikauskas | G06F 3/0414 | 345/173 |
| 2006/0164230 A1* | 7/2006 | DeWind | B60K 35/00 | 340/461 |
| 2006/0214871 A1* | 9/2006 | Iwamura | G06F 1/1601 | 345/1.1 |
| 2006/0284858 A1* | 12/2006 | Rekimoto | G06F 3/0481 | 345/173 |
| 2008/0094367 A1* | 4/2008 | Van De Ven | G06F 3/0488 | 345/173 |
| 2008/0204427 A1* | 8/2008 | Heesemans | G06F 3/0414 | 345/174 |
| 2009/0109187 A1 | 4/2009 | Noma | | |
| 2009/0140985 A1* | 6/2009 | Liu | G06F 3/011 | 345/168 |
| 2009/0237374 A1* | 9/2009 | Li | G06F 3/0488 | 345/174 |
| 2009/0322695 A1* | 12/2009 | Cho | G06F 3/0416 | 345/173 |
| 2010/0283713 A1* | 11/2010 | Fein | G06F 1/1652 | 345/76 |
| 2012/0019482 A1* | 1/2012 | Wang | G06F 1/1652 | 345/175 |
| 2012/0280924 A1* | 11/2012 | Kummer | G06F 1/1647 | 345/173 |
| 2012/0293551 A1* | 11/2012 | Momeyer | G06F 3/0488 | 345/633 |
| 2013/0058063 A1 | 3/2013 | O'Brien | | |
| 2013/0127918 A1* | 5/2013 | Kang | G06F 3/0487 | 345/660 |
| 2013/0252668 A1* | 9/2013 | Cheng | G06F 1/1652 | 455/556.1 |
| 2013/0275910 A1* | 10/2013 | Kim | G06F 1/1647 | 715/800 |
| 2014/0168093 A1* | 6/2014 | Lawrence | G06F 3/016 | 345/173 |
| 2014/0194165 A1* | 7/2014 | Hwang | G06F 1/1652 | 455/566 |
| 2014/0333545 A1* | 11/2014 | Lee | G06F 3/04883 | 345/173 |
| 2014/0340318 A1* | 11/2014 | Stringer | G06F 3/03545 | 345/173 |
| 2014/0375702 A1* | 12/2014 | Cho | G06F 3/04886 | 345/102 |
| 2015/0145796 A1* | 5/2015 | Lee | G06F 3/0416 | 345/173 |
| 2015/0185980 A1 | 7/2015 | An et al. | | |
| 2015/0220118 A1* | 8/2015 | Kwak | G09F 9/00 | 345/667 |
| 2016/0034086 A1* | 2/2016 | Milam | G06F 3/0414 | 345/173 |
| 2016/0147261 A1* | 5/2016 | Bohn | H04B 1/3833 | 455/566 |
| 2016/0188181 A1* | 6/2016 | Smith | G06F 3/04886 | 715/765 |
| 2016/0259528 A1* | 9/2016 | Foss | G06F 3/016 | |
| 2016/0274728 A1* | 9/2016 | Luo | G06F 3/0412 | |
| 2017/0010727 A1 | 1/2017 | Jeon et al. | | |
| 2017/0061932 A1* | 3/2017 | Kwon | G06F 3/0488 | |
| 2017/0115793 A1* | 4/2017 | Namgoong | G06F 3/0414 | |
| 2017/0168769 A1* | 6/2017 | Jeon | G06F 1/1652 | |
| 2018/0039368 A1* | 2/2018 | Choi | G06F 3/0414 | |
| 2018/0046359 A1* | 2/2018 | Kim | G06F 3/04842 | |
| 2018/0074694 A1* | 3/2018 | Lehmann | G06F 3/04883 | |
| 2018/0088695 A1* | 3/2018 | Kim | G06F 1/1643 | |

(56) References Cited

U.S. PATENT DOCUMENTS

| | | | | |
|---|---|---|---|---|
| 2018/0121078 A1* | 5/2018 | Kim | .................... | G06F 3/04883 |
| 2018/0181164 A1* | 6/2018 | Chen | .................... | G06F 1/1652 |
| 2018/0188778 A1* | 7/2018 | Shin | .................... | G06F 1/1652 |
| 2018/0321780 A1* | 11/2018 | Park | .................... | G06F 3/041 |
| 2019/0012008 A1* | 1/2019 | Yoon | .................... | H04M 1/725 |
| 2019/0261519 A1* | 8/2019 | Park | .................... | G02F 1/133305 |
| 2019/0268455 A1* | 8/2019 | Baek | .................... | G06F 1/1652 |
| 2020/0022268 A1* | 1/2020 | Zuo | .................... | G09G 3/20 |
| 2020/0033913 A1* | 1/2020 | Yang | .................... | G06F 1/1616 |
| 2020/0177718 A1* | 6/2020 | Cao | .................... | G06F 1/1679 |
| 2020/0253063 A1* | 8/2020 | Jiang | .................... | G06F 1/1652 |
| 2020/0264660 A1* | 8/2020 | Song | .................... | H04M 1/0268 |
| 2021/0044683 A1* | 2/2021 | He | .................... | H04M 1/0268 |

FOREIGN PATENT DOCUMENTS

| | | | |
|---|---|---|---|
| KR | 10-2017-0006917 A | 1/2017 |
| KR | 10-2019-0077107 A | 7/2019 |
| KR | 10-2019-0101184 A | 8/2019 |

OTHER PUBLICATIONS

Korean Notice of Patent Grant dated Mar. 15, 2021.
International Search Report dated Aug. 13, 2021.

* cited by examiner

ELECTRONIC DEVICE AND METHOD FOR INDUCING INPUT

CROSS-REFERENCE TO RELATED APPLICATION(S)

This application is based on and claims priority under 35 U.S.C. § 119 to Korean Patent Application No. 10-2020-0131973, filed on Oct. 13, 2020, in the Korean Intellectual Property Office, the disclosure of which is incorporated by reference herein in its entirety.

TECHNICAL FIELD

The invention is directed to an electronic device, and more particularly, to an electronic device with an expandable screen.

BACKGROUND

In recent times, portable electronic devices such as smartphones have rapidly increased in performance. Accordingly, there has been a desire to increase display size to increase performance and usability. However, this must be balanced against the need to maintain portability.

SUMMARY

One solution which increases display size, but also maintains portability, may be the use of a rollable display, which can be extended in order to create a larger screen. Portability is maintained as the rollable display can be stowed, reducing the size of the display, and extended specifically when a user desires a larger screen.

A potential issue with this kind of expandable electronic device is that a certain level of force may needed to extend the display. Due to the requisite strength needed to perform the action, the extension operation may be difficult or non-intuitive for some users.

Furthermore, if the display extends in stages, there may be limits to the ability of the user to sense the requisite amounts of force each of the different stages of extension.

An electronic device according to certain embodiments of the disclosure may include a housing including a first sub-housing, and a second sub-housing movable with respect to the first sub-housing and coupled to the first sub-housing, a flexible display coupled with the housing, movable to expand or reduce an exposed display area of the flexible display according to a movement of the second housing, a sensor, at least one processor, configured to detect a first input for the flexible display via the sensor and obtain a first value based on the first input, when the first value is equal to or greater than a first reference value, detect a second input after the first input using the sensor, display a first graphical user interface (GUI) element in response to the second input, and obtain a second value from the second input, based on detecting the second value is less than a second reference value, display the first GUI element based on the second value, and based on detecting the second value is equal to or greater than the second reference value, display a second GUI element on the flexible display, wherein the second housing is moved, causing extension of the display area.

A method of operating an electronic device according to certain embodiments of the disclosure may include detecting a first input for a flexible display via a sensor, obtaining a first value from the first input, based on detecting, by at least one processor, the first value is equal to or greater than a first reference value, detecting a second input following the first input, using the sensor, displaying a first graphical user interface (GUI) element in response to the second input, obtaining a second value from the second input, based on detecting the second value is less than a second reference value, displaying the first GUI element on the display based on the second value, and based on detecting the second value is equal to or greater than the second reference value, displaying a second GUI element on the flexible display, wherein the second housing is moved relative to the first housing, extending a display area of the flexible display.

An electronic device according to certain embodiments of the disclosure may include a flexible display that is movable to expand or reduce an exposed display area of the flexible display, according to movement of a portion of a housing, a sensor, at least one processor, configured to: detect a first input for the flexible display via the sensor and obtain a first value based on the first input, based on detecting the first value is equal to or greater than a first reference value, detect a second input following the first input via the sensor, display a first graphical user interface (GUI) element in response to the second input, and obtain a second value from the second input, based on detecting the second value is less than a second reference value, display the first GUI element based on the second value, based on detecting the second value is equal to or greater than the second reference value, and display a second GUI element on the flexible display, wherein the at least the portion of the housing is moved, causing extension of the display area.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1A:
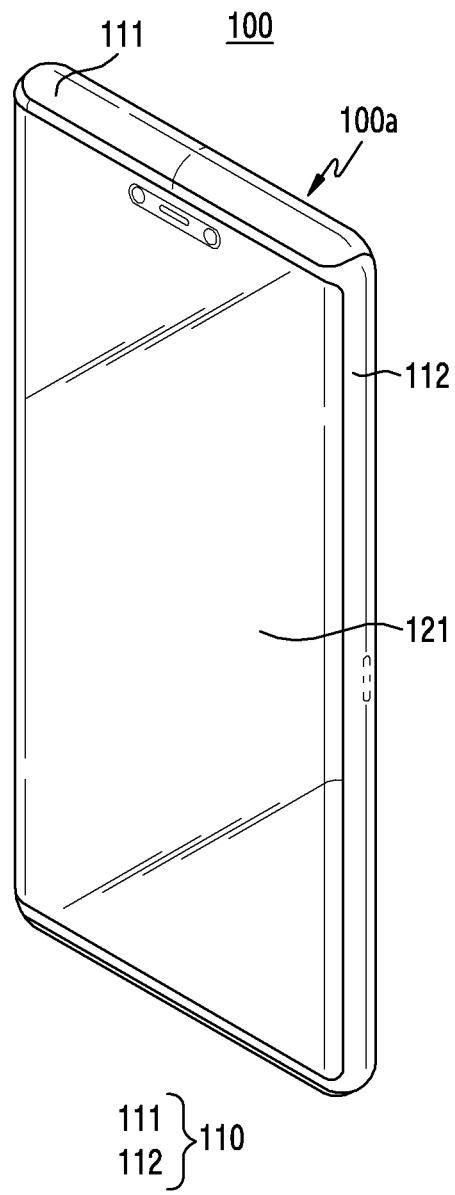
FIG. 1A is a perspective view of an electronic device of a first state according to an embodiment.
Figure 1B:
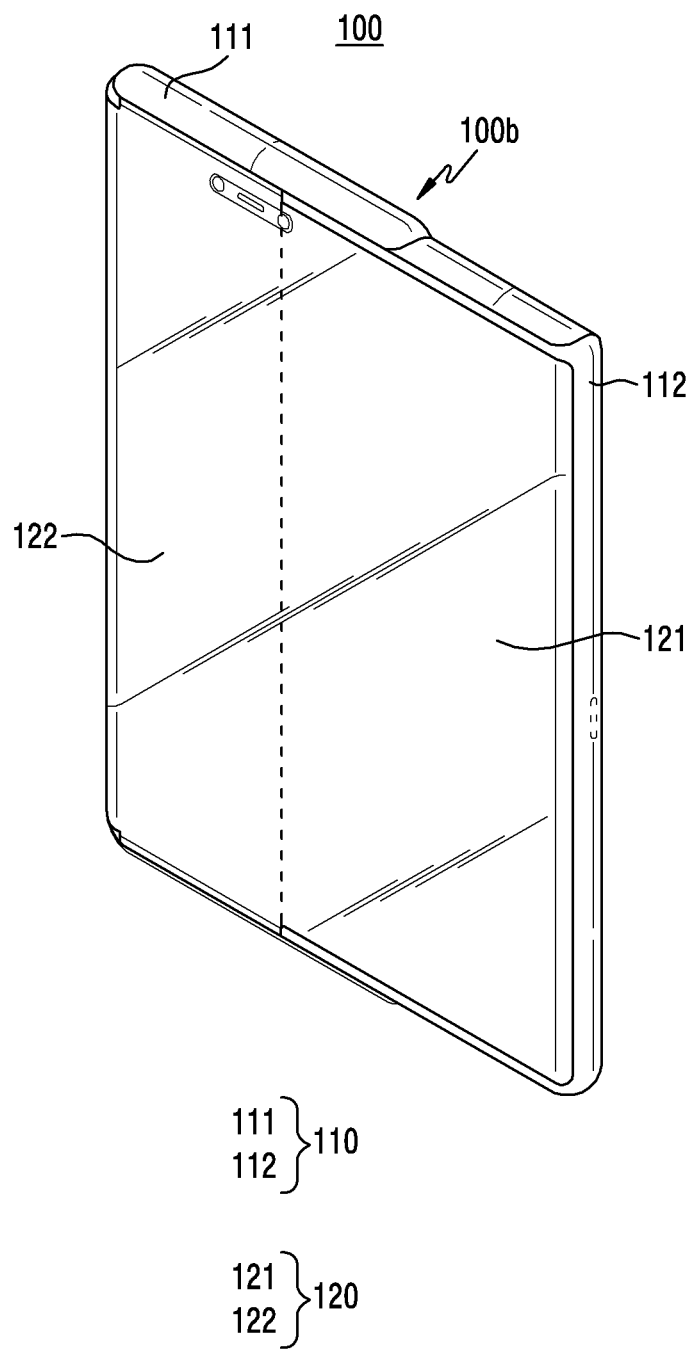
FIG. 1B is a perspective view of the electronic device of a second state according to an embodiment.

FIG. 1A is a perspective front view of an electronic device of a first state according to an embodiment, and FIG. 1B is a perspective front view of the electronic device of a second state according to an embodiment.

Referring to FIG. 1A and FIG. 1B together, a display 120 may be disposed in one surface of an electronic device 100 according to an embodiment. Hereafter, the surface including the display 120 may be referred to as a front surface. According to an embodiment, the display 120 may occupy most of the front surface of the electronic device 100. According to an embodiment, the display 120 may include a flat type and a curved type. The front surface of the electronic device 100 may include the display 120, and a housing 110 which surrounds at least part of the edges of the display 120. According to an embodiment, the housing 110 may form at least one some of the front surface, a side surface, and/or a rear surface of the electronic device 100. According to another embodiment, the housing 110 may form some of the side surface and the rear surface of the electronic device 100. According to an embodiment, the housing 110 may include a first housing 111 and a second housing 112 which is movable with respect to the first housing 111 (e.g., to facilitate expansion of the display).

According to an embodiment, the display 120 may include a first portion 121 which may be coupled to the second housing 112, and a second portion 122 which is extendable from the first portion 121 and retractable into the electronic device 100.

According to an embodiment, if the electronic device 100 changes from a first state 100*a* to a second state 100*b* according to movement of the second housing 112, the second portion 122 of the display 120 may be extended out of an interior of the electronic device 100 (e.g., by manual operation of the user, or by a motor included within the electronic device). According to an embodiment, if the electronic device 100 switches from the second state 100*b* to the first state 100*a* according to movement of the second housing 112, the second portion 122 of the display 120 may be retracted into the electronic device 100.

Figure 2:
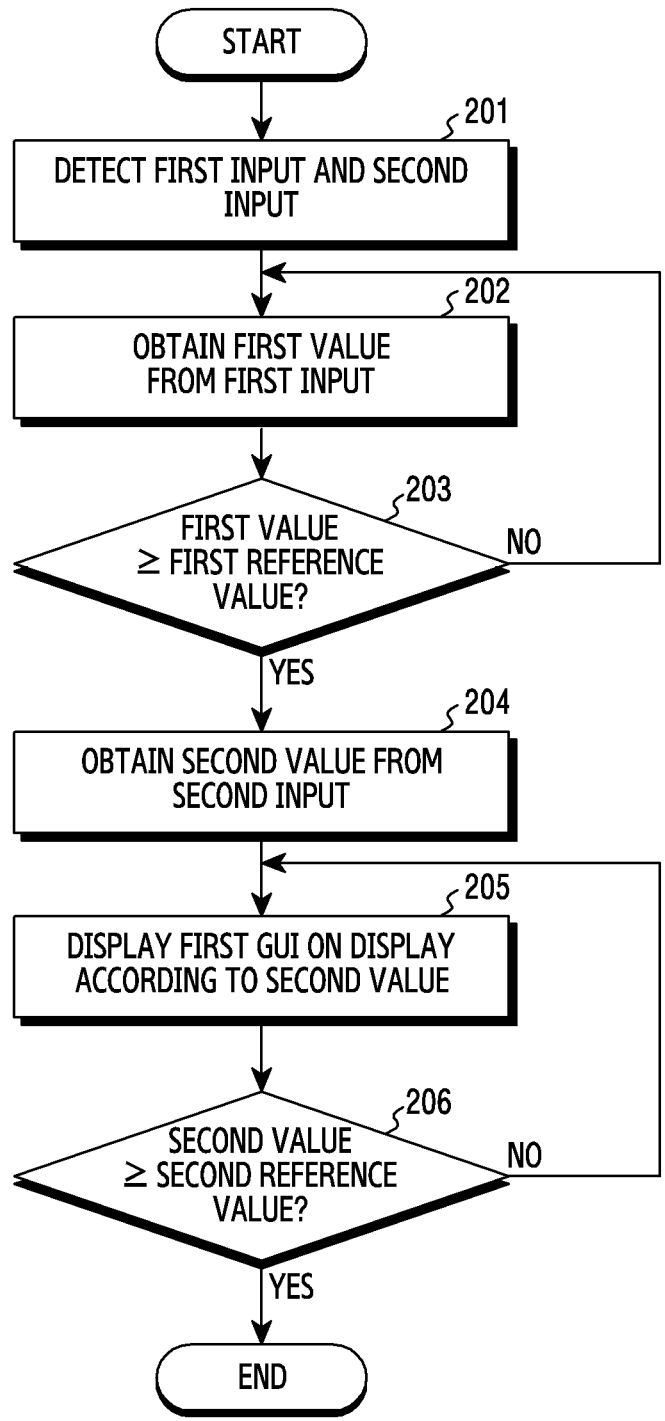
FIG. 2 is a flowchart of a method for displaying a graphical user interface (GUI) in response to an input according to an embodiment.

FIG. 2 is a flowchart of a method for displaying a graphical user interface (GUI) in response to an input according to an embodiment.

Referring to FIG. 1A, FIG. 1B and FIG. 2 together, the electronic device 100 according to an embodiment may detect an input and display a GUI on the display 120, in response to the detected input.

According to an embodiment, the electronic device 100 may include at least one processor. The at least one processor according to an embodiment may include at least one of a touch sensor or a pressure sensor. According to an embodiment, the electronic device 100 may detect a first input and a second input for the display 120 using the touch sensor in operation 201. According to another embodiment, the electronic device 100 may detect at least one of a first input and a second input for the display 120 using the touch sensor. For example, the touch sensor may include a plurality of electrodes, and may detect the input for the display 120 using the plurality of the electrodes.

According to an embodiment, the electronic device 100 may detect a first value of the first input using at least one sensor in operation 202. For example, the first input may be, but not limited to, a touch contact to the display 120, and the first value may include, but not limited to, a pressure value of the first input. A method for acquiring the pressure value may vary. For example, the electronic device 100 may estimate the pressure value directly using the pressure sensor. Alternatively the pressure level may be estimated from a touch input detected through the touch sensor (e.g., by a contact area of the touch input against the display). According to an embodiment, the electronic device 100 or the at least one processor of the electronic device 100 may compare the first value with a first reference value (e.g., prestored), in operation 203. According to an embodiment, if the first value is equal to or greater than the first reference value in operation 203, the electronic device 100 may acquire a second value of the second input using at least one sensor in operation 204. For example, the second input may be, but not limited to, an input for moving a second housing (e.g., the second housing 112 of FIG. 1B and FIG. 1B) with respect to a first housing (e.g., the first housing 111 of FIG. 1A and FIG. 1B), and the second value may include, but not limited to, at least one of the pressure value of the second input or a movement distance of the second housing according to the second input.

According to an embodiment, a processor (e.g., a processor 1520 of FIG. 15) may detect a capacitance change in accordance with the movement of the second housing and/or the display, by use of a touch sensor disposed in a sliding section of the electronic device 100, or a roller (not shown) of the housing of the electronic device 100. According to an embodiment, the processor may detect the movement of the second housing with respect to the first housing, by using a light sensor (e.g., or a time of flight (ToF) sensor, a proximity sensor). According to an embodiment, the processor may detect the movement using a "Hall" sensor which detects a magnetic field. According to an embodiment, the processor may detect the movement by mounting a specific number of magnets within an included sliding unit, and calculate a sliding distance by mounting a magnet in a roller (not shown) of the electronic device, thereby detecting rotations of the roller and calculating a count of the rotations based on a circumference of the roller. According to an embodiment, a wire may be disposed in the sliding section, and the processor may calculate changes in a resistance value in response to changes in a length of the wire. According to an embodiment, the processor may detect a sliding change using a motion sensor (e.g., an acceleration sensor, a gyro sensor).

According to an embodiment, based on the determination of operation 203 and the second value acquired in operation 204, the electronic device 100 may display a first GUI (e.g., a GUI element, an image, a graphic, an icon, etc.) on the display 120 in operation 205. According to an embodiment, the electronic device 100 may indicate a ratio of the movement distance of the second housing with respect to the first housing, through the first GUI element on the display 120. For example, if the pressure of the second input detected increases, the electronic device 100 may display and/or vary at least one of a text or an image according to the increasing pressure value, through the first GUI on the display 120. For example, the electronic device 100 may display the movement distance of the second housing through the first GUI element including at least one of a bar length, a color intensity, and a percentage on the display 120, which will be described in more detail below.

According to an embodiment, the electronic device 100 (e.g., via the at least one processor of the electronic device 100) may compare the second value with a second reference value (e.g., prestored), in operation 206. For example, if the detected pressure is less than the second reference value, the at least one processor may display the first GUI on the display 120. According to an embodiment, the reference value may be stored in a memory (not shown) of the electronic device 100. The electronic device 100 or the at least one processor of the electronic device 100 may update the first GUI which is displayed according to detected changes in the second value, while the second value remains less than the second reference value.

According to an embodiment, based on the operation 206, the at least one processor of the electronic device 100 may control the display to display a second GUI on the display 120. For example, if the second value is equal to or greater than the second reference value, the electronic device 100 may display the second GUI element on the display 120. According to an embodiment, the second GUI element may be displayed on the display 120, and the second housing 112 may be moved with respect to the first housing 111. For example, as the second housing 112 moves, a display area exposed to an exterior environment of the electronic device 100 may be extended.

The flowchart of FIG. 2 describes an embodiment, and at least some of operations of FIG. 2 may be changed in sequence or performed in parallel. For example, the first input may be detected in operation 201, and the second input may be detected in operation 204.

Figure 3:
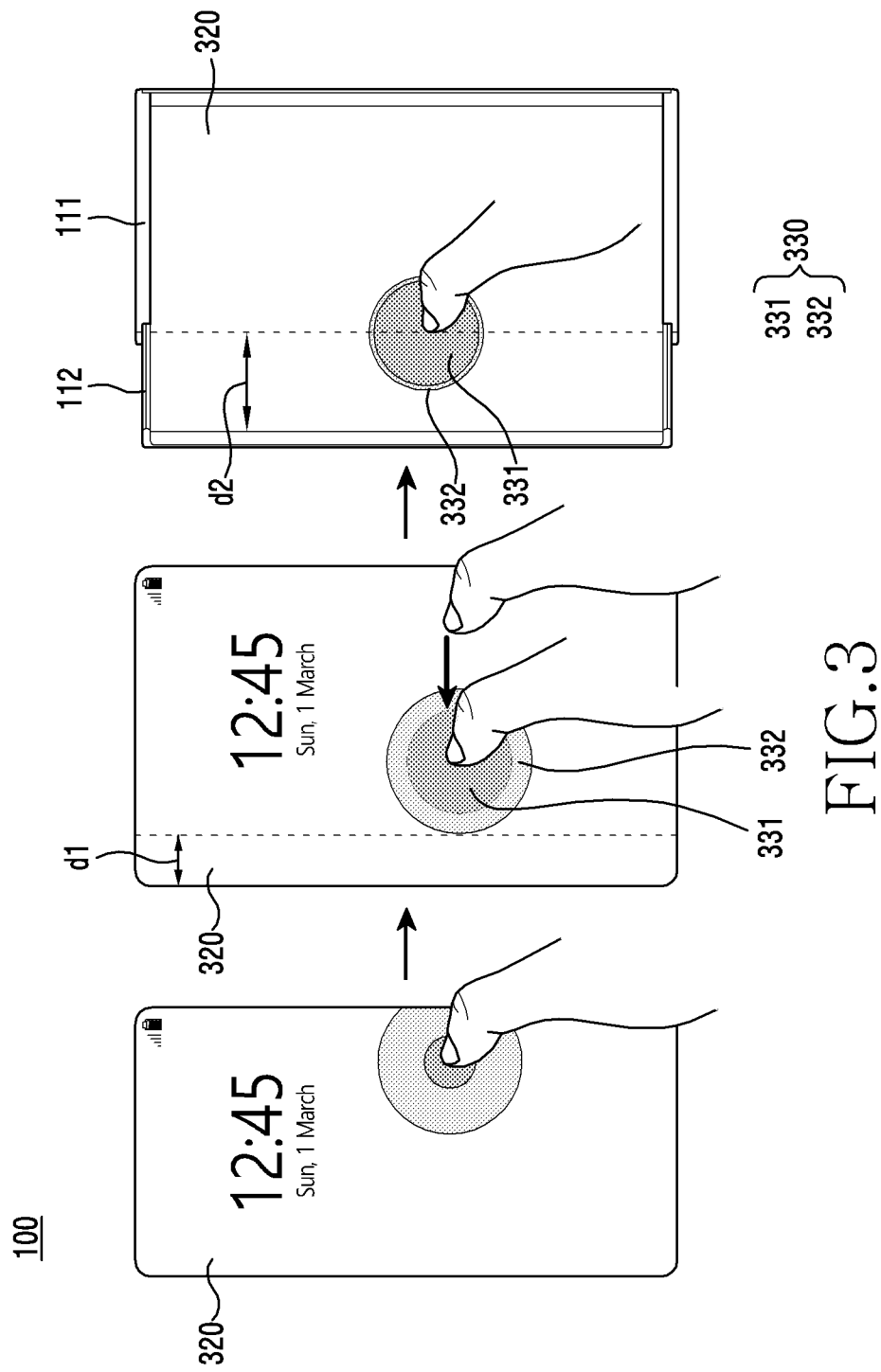
FIG. 3 is a view of an electronic device for displaying a circular interface in response to an input according to an embodiment.

FIG. 3 depicts an electronic device for displaying a GUI element including circular design elements, in response to an input according to an embodiment.

Referring to FIG. 3, an electronic device 100 according to an embodiment may include a first housing 111, a second housing 112 and a display 320. The same reference numeral is used for the same or substantially the same component as described earlier, and redundant explanations are omitted.

Referring to FIG. 3, the electronic device 100 according to an embodiment may detect an input for the display 320. According to an embodiment, the electronic device 100 may detect a touch input for the display 320 using at least one sensor in a first state (e.g., the first state 100a of FIG. 1A). For example, the input for the display 320 may include a first input applied in a direction perpendicular to the display 320 and a second input applied in a direction to extend or reduce an area of the display 320 exposed to outside of the electronic device 100. According to an embodiment, the electronic device 100 may obtain a first value and a second value from the first input and the second input respectively. For example, the second value may include a pressure value acquired through a pressure sensor, and the pressure value may include, but not limited to, not only a physical pressure value but also a value determined based on a touch area. For example, the first value may include touch coordinates acquired through a touch sensor. Hereafter, the first value and the second value include the pressure value for the sake of explanations.

If the second input is detected, the electronic device 100 according to an embodiment may display a first circular GUI 330 (e.g., an icon or graphic element) on the display 320. For example, the first circular GUI 330 may include at least one concentric circle centered on a detected contact position of the first input on the display 320.

According to an embodiment, the first circular GUI 330 may include a first circle 331 having a size corresponding to changes in the second value. For example, if the pressure value of the second input increases, the first circle 330 may increase in size in response to the increase in the pressure value of the second input. According to an embodiment, the first circular GUI 330 may include a second circle 332 having a size corresponding to a prestored reference value.

According to an embodiment, if the second value is less than a reference value, the electronic device 100 may display the first circle 331 at a size smaller than the second circle 332. If the second value is less than the reference value, the state of the electronic device 100 may be one in which the second housing 112 moves with respect to the first housing 111 by "d1" as illustrated, in a direction away from the first housing 111. According to an embodiment, if the second housing 112 moves away from the first housing 111 by d1, and subsequently the second input is removed, the electronic device 100 may return (e.g., retract) to a first state (e.g., the first state 100a of FIG. 1A), via an internal mechanical driving unit.

According to an embodiment, if the second value is equal to or greater than the reference value, the electronic device 100 may display the first circle 331 at a size greater than the second circle 332. If the second value is equal to or greater than the reference value and the second input is removed, the electronic device 100 may change to a second state (e.g., the second state 100b of FIG. 1B) by means of a mechanized internal structure and/or driving unit. For example, if the second value is equal to the reference value, the second housing 112 may move away from the first housing 111 by d2. According to the movement of the second housing 112, the area exposed to the outside of the electronic device 100 may be extended in the display 320.

According to an embodiment, if the second value is equal to or greater than the reference value, the electronic device 100 may display a second GUI on the display 320. For example, if the second value is equal to the reference value, the electronic device 100 may display the second GUI, indicating the movement of the second housing 112 on the display 320.

Figure 4:
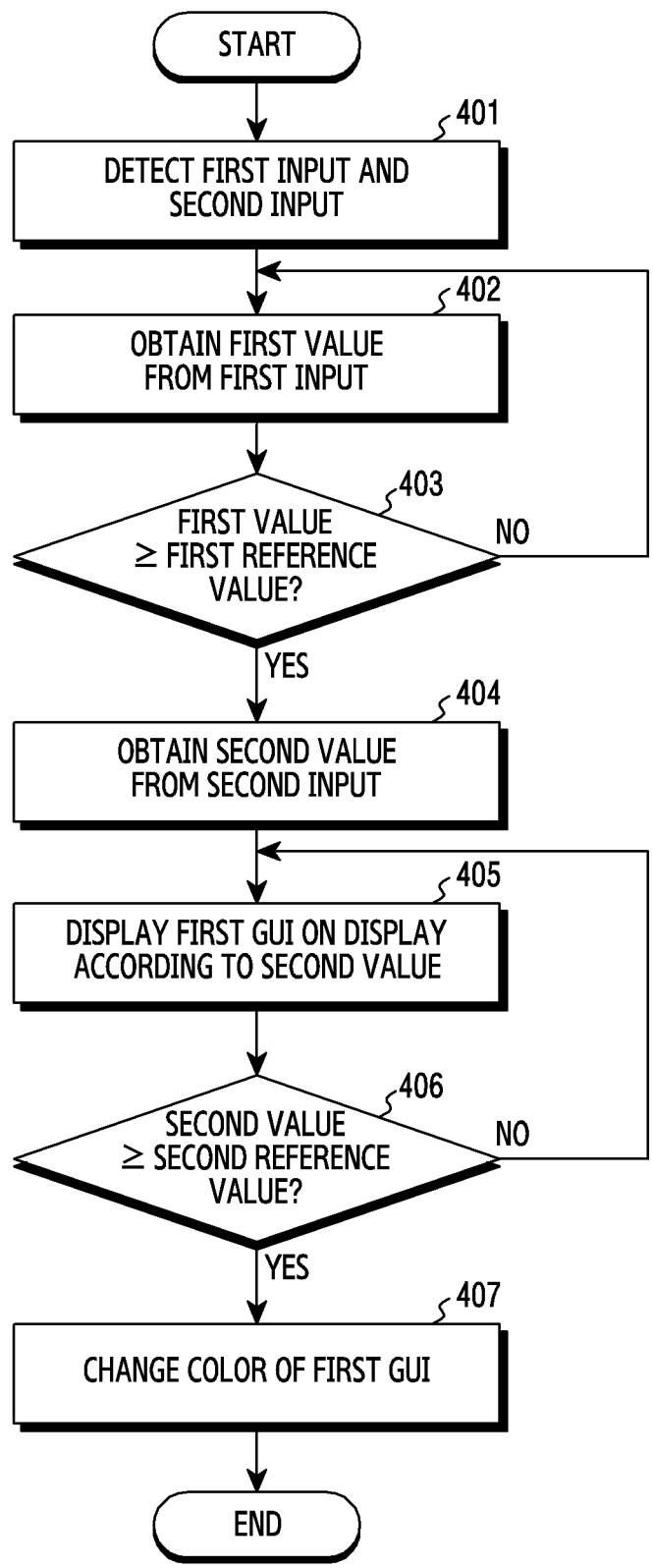
FIG. 4 is a flowchart of a method for changing a GUI color in response to pressures of a first input and a second input according to an embodiment.

FIG. 4 is a flowchart of a method for displaying a GUI according to pressures of a first input and a second input according to an embodiment.

Referring to FIG. 2 and FIG. 4 together, the electronic device 100 according to an embodiment may detect a first input and a second input, and display a GUI on the display 120 according to pressures of the detected inputs. The same/like reference numeral is used for the same or substantially the same component as described earlier, and redundant explanations are omitted.

According to an embodiment, the electronic device 100 may detect the first input and the second input using at least one sensor (e.g., a touch sensor) in operation 401. According to an embodiment, the electronic device 100 may detect at least one of the first input and the second input, using at least one sensor. According to an embodiment, the electronic device 100 may detect a first value of the first input using at least one sensor in operation 402. According to an embodiment, the electronic device 100 or the at least one processor of the electronic device 100 may compare the first value with a first reference value (e.g., prestored), in operation 403. According to an embodiment, if determined that the first value is equal to or greater than the first reference value in operation 403, the electronic device 100 may acquire a second value of the second input using at least one sensor in operation 404. According to an embodiment, based on the determination of operation 403 and the second value acquired in operation 404, the electronic device 100 may display a first GUI on the display 120 in operation 405.

According to an embodiment, the at least one processor of the electronic device 100 may compare the detected pressure with a second reference value (e.g., prestored), in operation 406. For example, if the detected pressure falls below the reference value, the at least one processor may display the first GUI on the display 120.

According to an embodiment, based on the determination of operation 406, the at least one processor of the electronic device 100 may control the display to change a color of the first GUI in operation 407. For example, if the second value is equal to or greater than the second reference value, the electronic device 100 may change the color of the first GUI, but not limited to, from green to red. According to an embodiment, the electronic device 100 may change the color of the first GUI and move the second housing 112 with respect to the first housing 111. For example, according to the movement of the second housing 112, the display area exposed to outside of the electronic device 100 may be extended.

Figure 5:
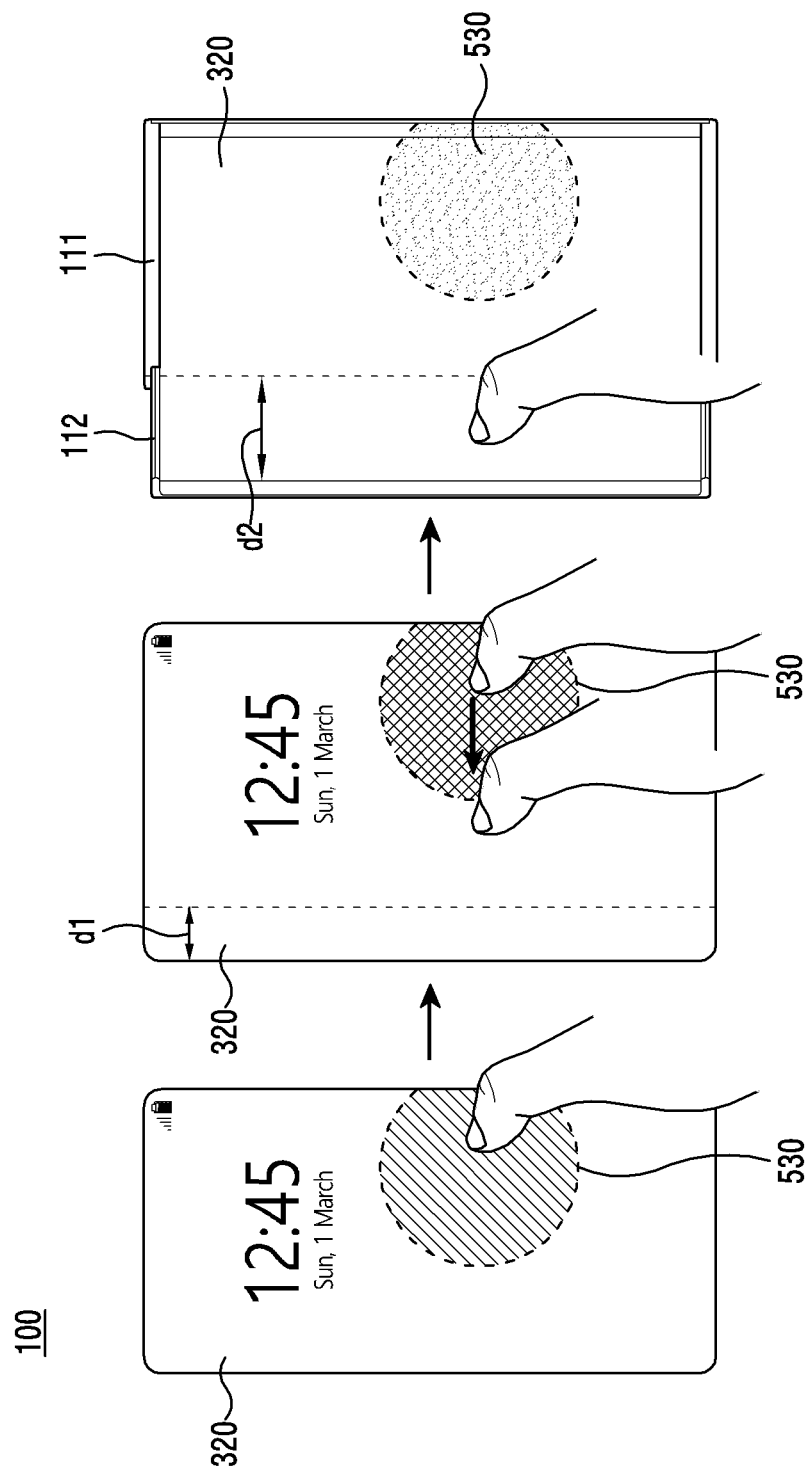
FIG. 5 is a view of an electronic device for displaying an interface which changes a color in response to an input according to an embodiment.

FIG. 5 depicts an electronic device for displaying an interface element which changes color in response to an input according to an embodiment.

Referring to FIG. 5, an electronic device 100 according to an embodiment may include a first housing 111, a second housing 112 and a display 320. The same reference numeral is used for the same or substantially the same component as described earlier, and redundant explanations are omitted.

Referring to FIG. 2 and FIG. 5 together, if detecting a second input, the electronic device 100 may display a first GUI 530 on the display 320. For example, the first GUI 530 may include a concentric circle centered on a contact position of the second input on the display 320. According to an embodiment, the first GUI 530 may be displayed in a first region of the display 320.

According to an embodiment, the first GUI 530 may include a color distinct from a second region, excluding the first region in the display 320. For example, the second region may include red, and the first region may include green in the display 320. According to an embodiment, the first GUI 530 may change color according to the second value. For example, as the second value increases, the first GUI 530 may change from green, to amber, and then to red to signify increasing pressure. According to an embodiment, if the second value is equal to or greater than a prestored reference value, the electronic device 100 may display a second GUI on the display 320. According to an embodiment, a color may be displayed corresponding to the pre-stored reference value.

According to an embodiment, if the second value is equal to or greater than the prestored reference value, the electronic device 100 may move the second housing 112 away from the first housing 111. According to an embodiment, as the second housing 112 moves, more and more of the display 320 may be exposed to an exterior environment of the electronic device 100. According to an embodiment, the second housing 112 may be moved in the same manner as the second housing 112 of FIG. 3.

Figure 6:
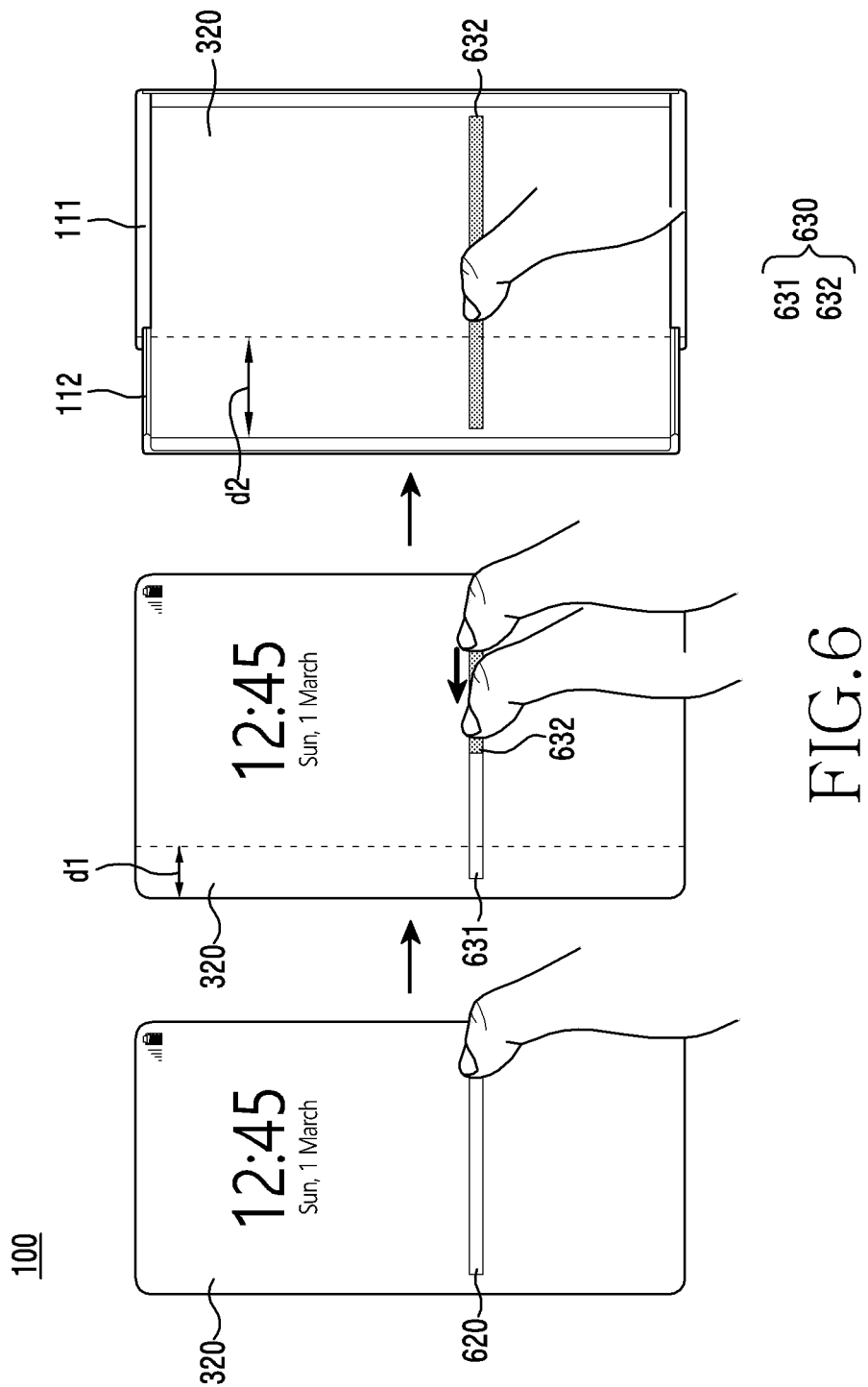
FIG. 6 is a view of an electronic device for displaying a bar-type interface in response to an input according to an embodiment.

FIG. 6 depicts an electronic device for displaying a bar-type interface in response to an input according to an embodiment.

Referring to FIG. 6, an electronic device 100 according to an embodiment may include a first housing 111, a second housing 112 and a display 320. The same reference numeral is used for the same or substantially the same component as described earlier, and redundant explanations are omitted.

The electronic device 100 according to an embodiment may detect a first input for the display 320, using at least one sensor. According to an embodiment, when detecting the first input, the electronic device 100 may display a UI 620 providing guidance fora second input on the display 320.

According to an embodiment, when detecting the second input, the electronic device 100 may display a first bar-type GUI 630 on the display 320. For example, the first bar-type GUI 630 may include a bar including a detection position of the second input on the display 320 (e.g., a bar graph).

According to an embodiment, the first bar-type GUI 630 may include a first region 631 corresponding to a prestored reference value. According to an embodiment, the first bar-type GUI 630 may include a second region 632 distinguished from the first region 631 and corresponding to a second value. For example, if a pressure of the second input increases, a ratio of the second region 632 to the first region 631 may increase.

According to an embodiment, if the second value falls below the reference value, the electronic device 100 may display the second region 632 smaller in size than the first region 631. If the second value is less than the reference value, the state of the electronic device 100 may be a state in which the second housing 112 moves with respect to the first housing 111 by d1 in a direction away from the first housing 111. According to an embodiment, if the second housing 112 moves away from the first housing 111 by d1 and the second input is removed, the electronic device 100 may return to a first state 100a by means of a mechanized internal structure and/or driving unit.

According to an embodiment, if the second value is equal to or greater than the reference value, the electronic device 100 may display the second region 632 greater in size than the first region 631. If the second value is equal to or greater than the reference value and the second input is removed, the electronic device 100 may change to a second state 100b by means of a mechanized internal structure and/or driving unit. For example, if the second value is equal to the reference value, the second housing 112 may move away from the first housing 111 by d2. According to the movement of the second housing 112, the area exposed to the outside of the electronic device 100 may be extended in the display 320. According to an embodiment, if the second value is equal to or greater than the reference value, the electronic device 100 may display a second GUI on the display 320.

Figure 7:
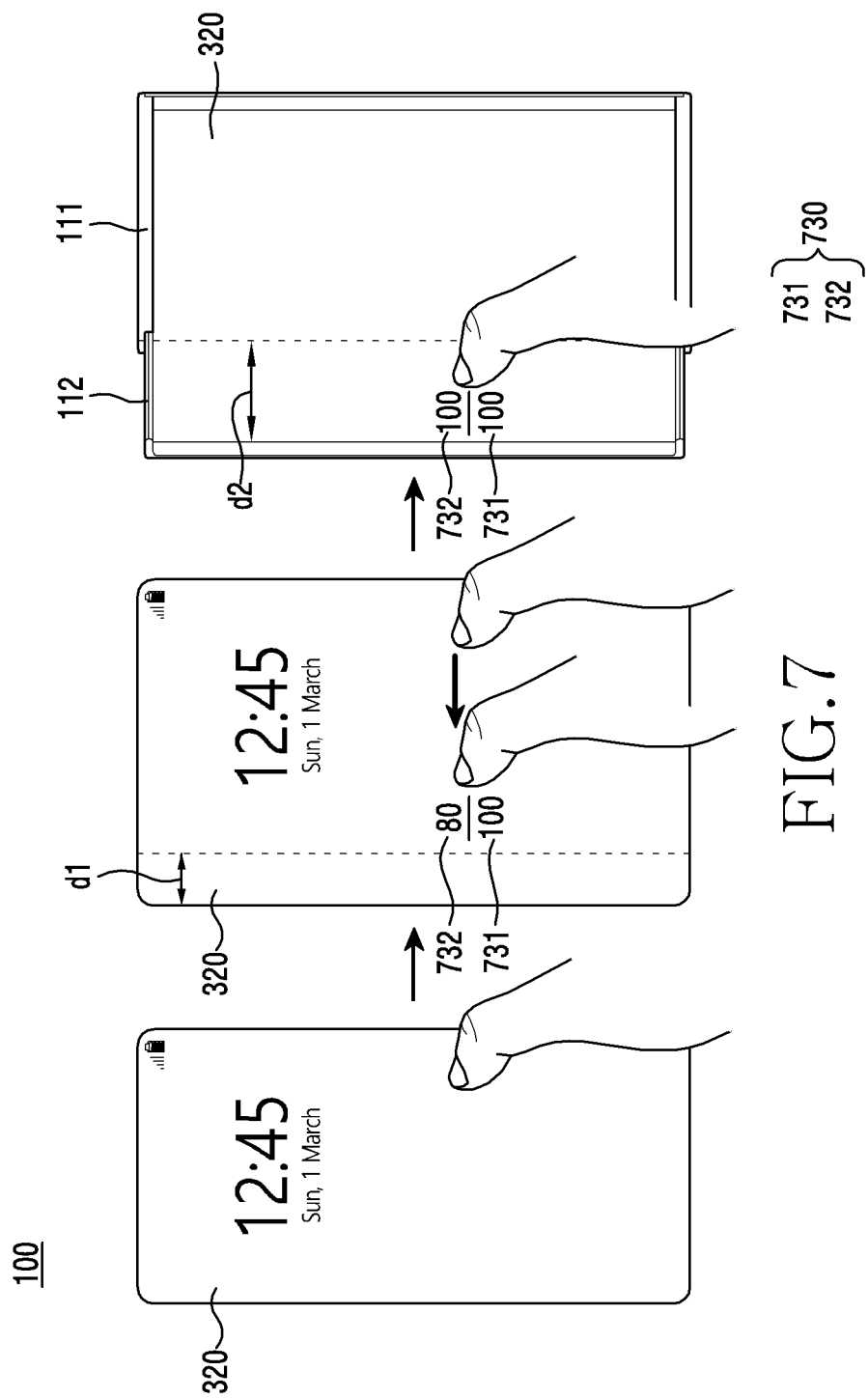
FIG. 7 is a view of an electronic device for displaying a number-type interface in response to an input according to an embodiment.

FIG. 7 depicts an electronic device for displaying a number-type interface in response to an input according to an embodiment.

Referring to FIG. 7, an electronic device 100 according to an embodiment may include a first housing 111, a second housing 112 and a display 320. The same reference numeral is used for the same or substantially the same component as described earlier, and redundant explanations are omitted.

The electronic device 100 according to an embodiment may detect a first input and a second input for the display 320, using at least one sensor. According to an embodiment, when detecting the second input, the electronic device 100 may display a first number-type GUI 730 on the display 320. According to an embodiment, the first number-type GUI 730 may be disposed at a detection position of the second input on the display 320.

According to an embodiment, the first number-type GUI 730 may include a first number 731 corresponding to a prestored reference value. According to an embodiment, the first number-type GUI 730 may include a second number 732 corresponding to the second value. For example, if the pressure of the second input increases, the second number 732 may increase to indicate the increased pressure.

According to an embodiment, if the second value falls below the reference value, the electronic device 100 may display the second number 732 at a size smaller than the first number 731. If the second value falls below the reference value, the electronic device 100 may enter a state in which the second housing 112 moves with respect to the first housing 111 by d1, in a direction away from the first housing 111. According to an embodiment, if the second housing 112 moves away from the first housing 111 by d1 and the second input is removed, the electronic device 100 may automatic return to a first state 100a (e.g., retract) by means of an internal structure or driving unit.

According to an embodiment, if the second value is equal to or greater than the reference value, the electronic device 100 may display the second number 732 at a size greater than the first number 731. If the second value is equal to or greater than the reference value and the second input is removed, the electronic device 100 may switch to a second state (e.g., the second state 100b of FIG. 1B) by means of the mechanized internal structure and/or driving unit (e.g., a motor that controls extension and/o retraction). If the second value is equal to the reference value, the second housing 112 may move away from the first housing 111 by d2. According to the movement of the second housing 112, the area exposed to the outside of the electronic device 100 may be extended in the display 320. According to an embodiment, if the second value is equal to or greater than the predesignated reference value, the electronic device 100 may display a second GUI on the display 320.

Figure 8:
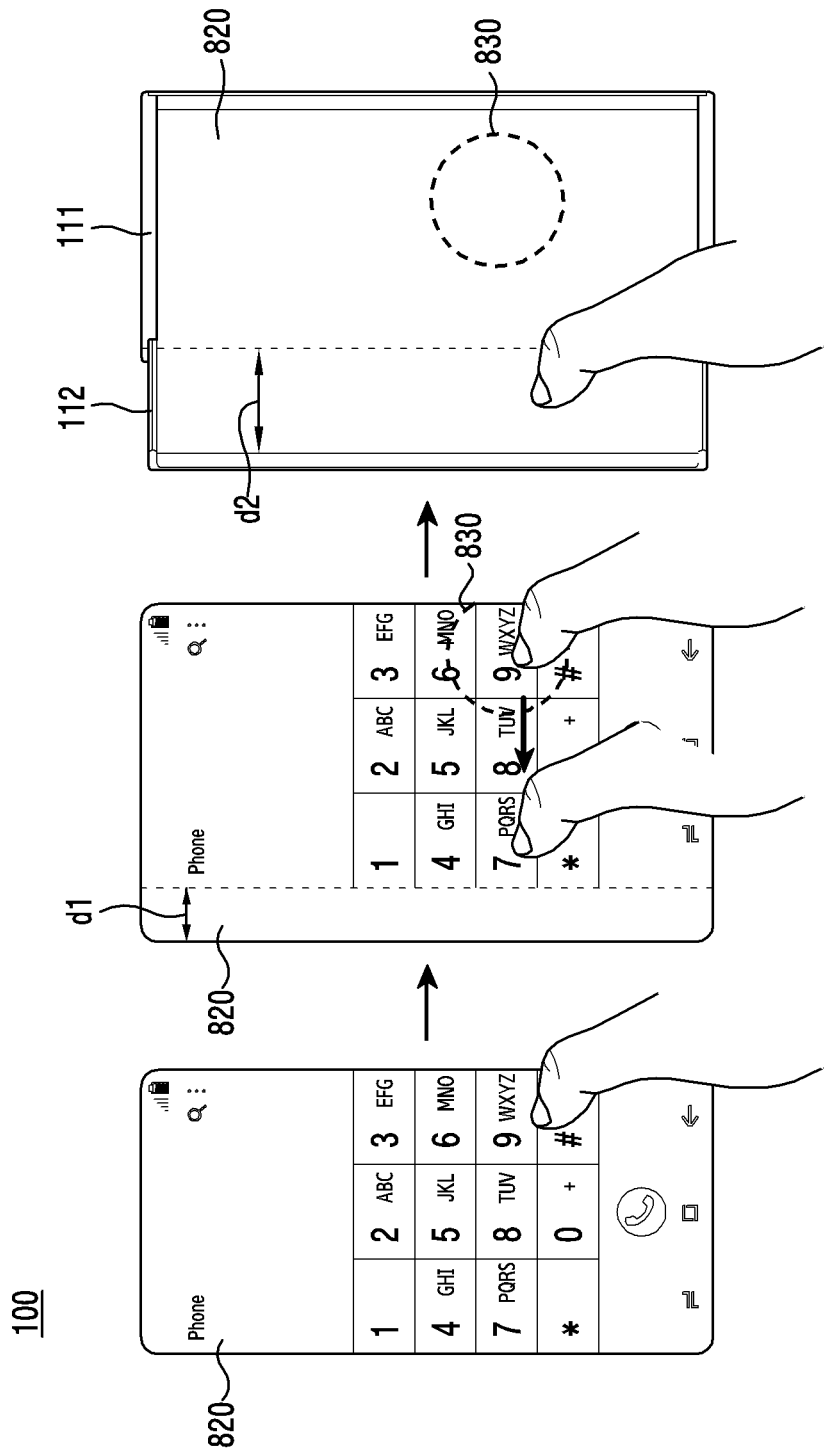
FIG. 8 is a view of an electronic device for displaying a graphical interface in response to an input according to an embodiment.

FIG. 8 depicts an electronic device for displaying a graphical interface in response to an input according to an embodiment.

Referring to FIG. 8, an electronic device 100 according to an embodiment may include a display 820, a first housing 111, and a second housing 112. The same reference numeral is used for the same or substantially the same component as described earlier, and redundant explanations are omitted.

According to an embodiment, the electronic device 100 may include a UI on the display 820. For example, the electronic device 100 may include the UI including a telephone keypad on the display 820.

According to an embodiment, the electronic device 100 may detect a first input and a second input for the display 820 while displaying the UI. According to an embodiment, when detecting the second input, the electronic device 100 may display a first GUI 830 on the display 820. According to an embodiment, the first GUI 830 may be displayed at a contact position of the second input on the display 820.

According to an embodiment, the first GUI 830 may include display of a first visual effect. For example, the first effect may include a shimmering effect disposed within a region of the display 820. For example, the first effect may include, but not limited to, a deformation (e.g., denting) to a boundary of a region displayed on the display 820.

According to an embodiment, the electronic device 100 may include at least one processor. According to an embodiment, the at least one processor may detect a second value from the second input, and compare the detected second value with a prestored reference value. According to an embodiment, if the second value is equal to or greater than the reference value, the electronic device 100 may display a second effect through the first GUI 830. For example, the second effect may include, but not limited to, an effect of recovering the dented region of the display 820 in succession to the first effect.

According to an embodiment, if the second value is equal to or greater than the reference value, the second housing 112 may move away from the first housing 111 by d1. According to an embodiment, if the second value is equal to or greater than the reference value, the second housing 112 may move away from the first housing 111 by d2. According to an embodiment, the second housing 112 may be moved in the same manner as the second housing 112 of FIG. 3.

Figure 9:
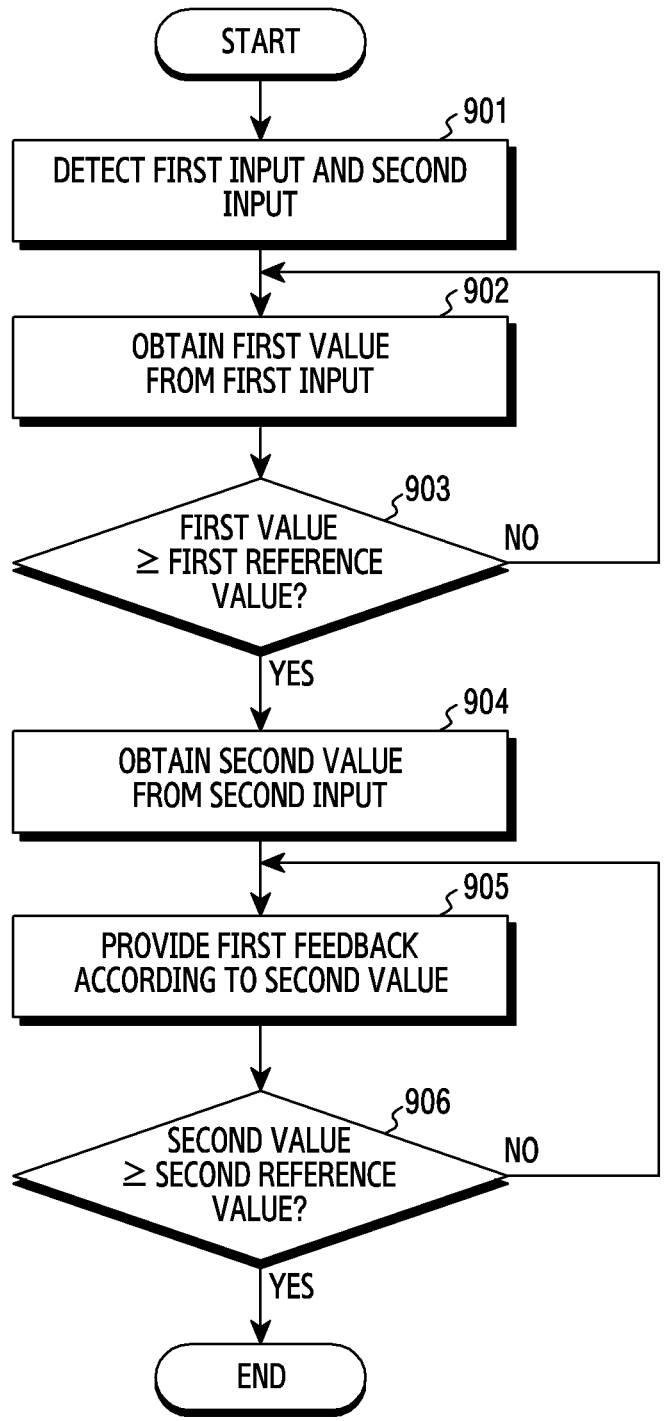
FIG. 9 is a flowchart of a method for providing a feedback in response to an input according to an embodiment.

FIG. 9 is a flowchart of a method for providing a feedback in response to an input according to an embodiment.

Referring to FIG. 1A, FIG. 1B and FIG. 9 together, an electronic device 100 according to an embodiment may detect a first input and a second input and provide a feedback in response. The same/like reference numeral is used for the same or substantially the same component as described earlier, and redundant explanations are omitted.

According to an embodiment, the electronic device 100 may detect the first input and the second input for a display 120 using a touch sensor in operation 901. According to an embodiment, the electronic device 100 may detect a first value of the first input using at least one sensor in operation 902. According to an embodiment, the at least one processor of the electronic device 100 may compare the first value with a first reference value (e.g., that is prestored), in operation 903. According to an embodiment, if determined that the first value is equal to or greater than the first reference value in operation 903, the electronic device 100 may acquire a second value of the second input using at least one sensor in operation 904. For example, the first value and the second value may include, but not limited to, a pressure value of the second input.

According to an embodiment, based on the determination of operation 903 and the second value acquired in operation 904, the electronic device 100 may provide a first feedback in operation 905. According to an embodiment, the first feedback may include a haptic feedback. For example, in response to the detected pressure value of the second input, the electronic device 100 may control a haptic motor to initiate generation of vibrations. For example, if the detected second value increases, the electronic device 100 may increase a vibration level. According to another embodiment, the first feedback may include a sound feedback. For example, the electronic device 100 may output a sound corresponding to the second value detected. For example, if the detected pressure value of the second input increases, the electronic device 100 may increase a sound level. The first feedback according to an embodiment may include, but not limited to, at least one of the sound or the vibration.

According to an embodiment, the electronic device 100 or the at least one processor of the electronic device 100 may compare the detected second value with a second reference value (e.g., prestored), in operation 906. According to an embodiment, based on the comparison result, while the second value is less than the reference value, the electronic device 100 may provide the first feedback in response to the second value.

Figure 10:
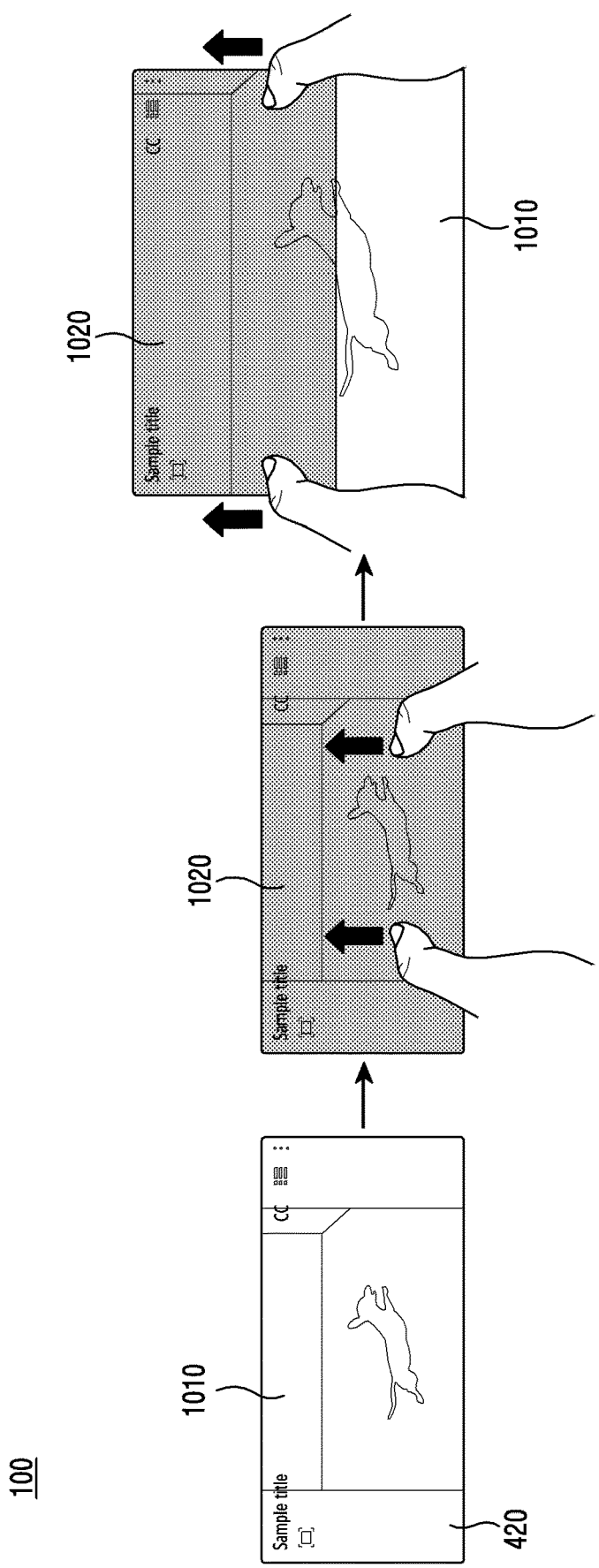
FIG. 10 is a view of an electronic device for displaying a lock screen in response to an input while displaying contents according to an embodiment.

FIG. 10 depicts an electronic device that displays a lock screen in response to an input while displaying contents according to an embodiment.

Referring to FIG. 10, the electronic device 100 according to an embodiment may include a display 420, and may display contents 1010 on the display 420. For example, the contents 1010 may include an image and/or a GUI.

According to an embodiment, the electronic device 100 may detect a first input, and a second input following the first input for the display 420. According to an embodiment, when detecting the second input, the electronic device 100 may display a first layer 1020 on the display 420. According to an embodiment, the first layer 1020 may be displayed in the style of a semi-transparent region, such that an original display screen 1010 is still visible through the layer 1020. According to an embodiment, while the first layer 1020 is displayed, additional inputs, such as a third input, that are entered following the second input will not be recognized to the displayed content 1010. Thus, the display 420 may be considered to be "locked," as to prevent erroneous or unauthorized inputs.

Referring to FIG. 1A, FIG. 1B and FIG. 10 together, the electronic device 100 according to an embodiment may drive movement of the second housing 112 based on a pressure of the second input. According to an embodiment, the first layer 1020 may move according to the movement of the second housing 112.

According to an embodiment, after the movement of the second housing 112 is finished, the first layer 1020 may be removed. For example, the first layer 1020 may be gradually removed in according to a movement direction of the second housing 112.

Figure 11:
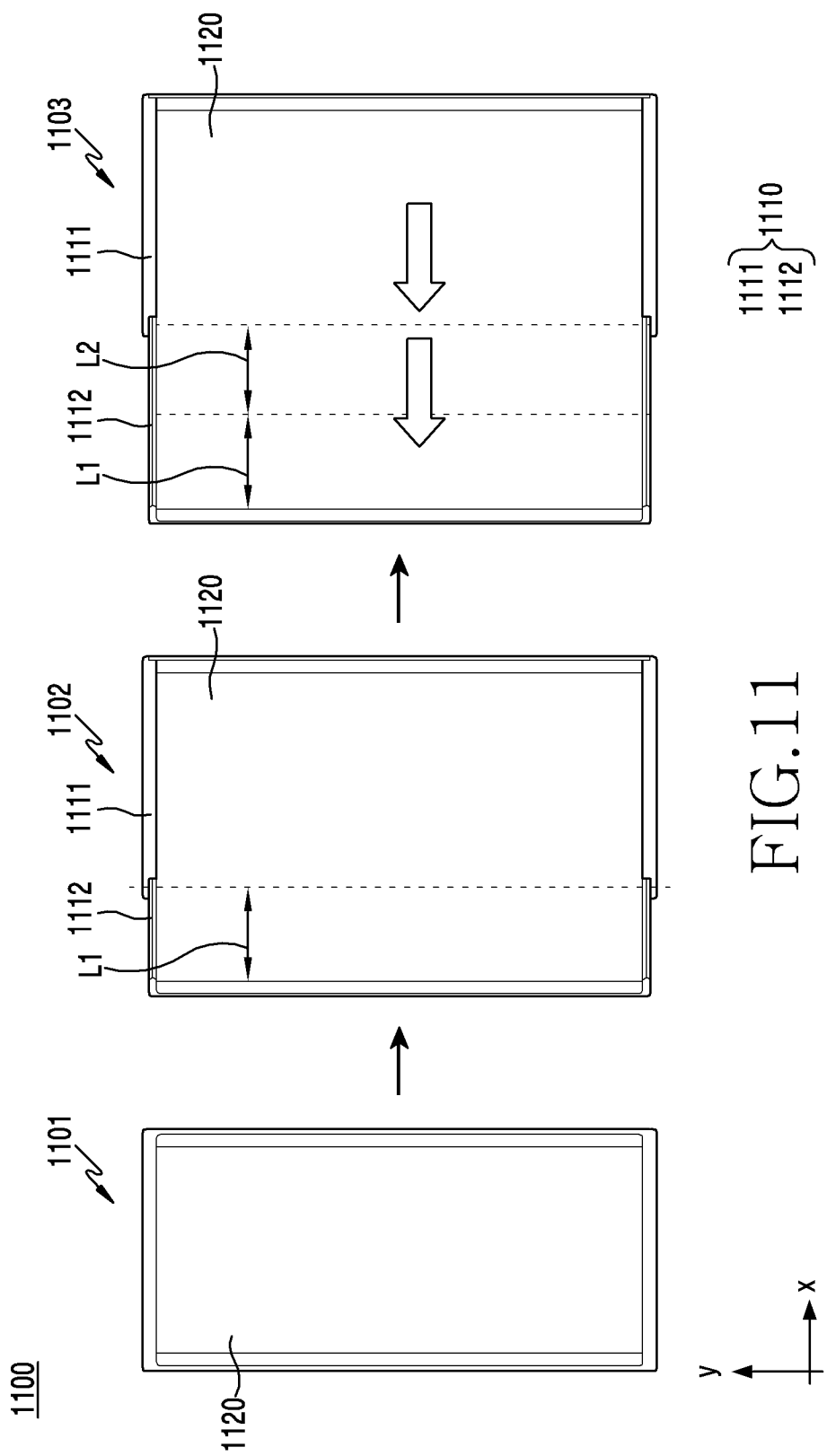
FIG. 11 is a view of an electronic device which is convertible stage by stage according to an embodiment.

FIG. 11 depicts an electronic device which is convertible stage by stage according to an embodiment.

Referring to FIG. 11, an electronic device 1100, according to an embodiment, may include a display 1120. According to an embodiment, the display 1120 may be disposed on one surface of the electronic device 1100. Hereafter, the surface including the display 1120 is referred to as a front surface. According to an embodiment, the display 1120 may include a flat type and a curved type. According to an embodiment, the front surface of the electronic device 1100 may include the display 1120, and a housing 1110 which surrounds at least part of edges of the display 1120. According to an embodiment, the housing 1110 may form at least some of the front surface, a side surface and a rear surface of the electronic device 1100. According to another embodiment, the housing 1110 may form at least part of the side surface, and/or the rear surface of the electronic device 1100. According to an embodiment, the housing 1110 may include a first housing 1111 and a second housing 1112 which is movable with respect to the first housing 1111.

According to an embodiment, the second housing 1112 may move in a first direction (e.g., −X direction) by a first distance L1 with respect to the first housing 1111 in a first state 1101, and thus the electronic device 1100 may be changed to a second state 1102. According to an embodiment, the second housing 1112 may move in the first direction by a second distance L2 with respect to the first housing 1111 in the second state 1102, and thus the electronic device 1100 may be changed to a third state 1103.

According to an embodiment, the second housing 1112 may move in a second direction (e.g., +X direction) which is opposite to the first direction, by the second distance L2 with respect to the first housing 1111 in the third state 1103, and thus the electronic device 1100 may switch to the second state 1102. According to an embodiment, the second housing 1112 may move in a second direction (e.g., +X direction) by the first distance L1 with respect to the first housing 1111 in the second state 1102, and thus the electronic device 1100 may be changed to the first state 1101.

According to an embodiment, if the second housing 1112 moves in the first direction with respect to the first housing 1111, part of the display 1120 of the electronic device 1100 may be extended out of the electronic device 1100. According to an embodiment, if the second housing 1112 moves in the second direction with respect to the first housing 1111, part of the display 1120 of the electronic device 1100 may be retracted into the electronic device 1100.

Figure 12:
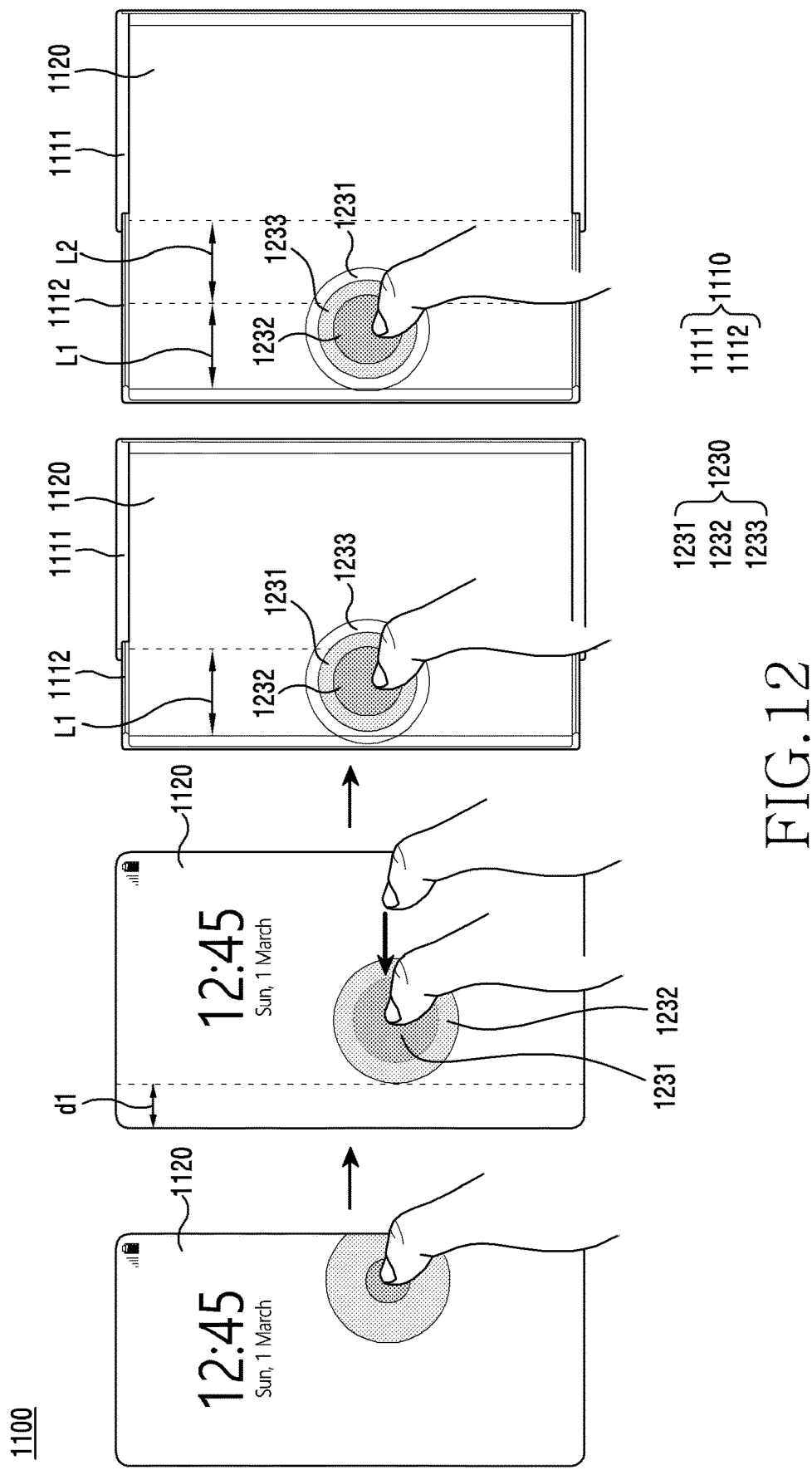
FIG. 12 is a view of an electronic device for displaying a stepwise circular interface in response to an input according to an embodiment.

FIG. 12 depicts an electronic device for displaying a stepwise circular interface in response to an input according to an embodiment.

Referring to FIG. 11 and FIG. 12 together, an electronic device 1100 according to an embodiment may include a first housing 1111, a second housing 1112 and a display 1120. The same reference numeral is used for the same or substantially the same component as described earlier, and redundant explanations are omitted.

According to an embodiment, the electronic device 1100 may detect a first input for the display 1120. For example, the electronic device 1100 may detect a touch input for the display 1120 using at least one sensor (e.g., a touch sensor).

According to an embodiment, if detecting a second input, the electronic device 1100 may display a first circular GUI 1230 on the display 1120. For example, the first circular GUI 1230 may include at least one concentric circle centered on a detection position of the first input on the display 1120. According to an embodiment, the first circular GUI 1230 may include a first circle 1231 having a size corresponding to a second value. For example, if a pressure of the second input increases, the first circle 1230 may increase in size in response to the pressure of the second input. According to an embodiment, the first circular GUI 1230 may include a second circle 1232 having a size corresponding to a first reference value (e.g., prestored). According to an embodiment, the first circular GUI 1230 may include a third circle 1233 having a size corresponding to a second reference value (e.g., prestored).

According to an embodiment, when the second value is less than the first reference value, the electronic device 1100 may display the first circle 1231 in a size smaller than the second circle 1232. If the second value is less than the first reference value, the second housing 1112 may move away from the first housing 1111 by d1. According to an embodiment, if the second housing 1112 moves away from the first housing 1111 by d1 and the second input is removed, the electronic device 1100 may return to a first state 1101 by means of a mechanized internal structure and/or driving unit. For example, slides, gearing and some kind of tension provided by a spring, elastic band, etc. may be utilized to create a mechanism by which the flexible display may automatically retract into the electronic device. Alternatively or in addition, a motor may be used to drive extension and/or retraction. Locking mechanisms may also be used to secure degrees of extension and/or retraction of the display.

According to an embodiment, when the second value is equal to or greater than the first reference value and less than the second reference value, the electronic device 100 may display the first circle 1231 at a size greater than the second circle 1232 and less than the third circle 1233. When the second value is equal to or greater than the first reference value and the second input is removed, the electronic device 1100 may return to a second state 1102 by means of the mechanized internal structure and/or driving unit. For example, if the second value is equal to the first reference value, the second housing 1112 may move away from the first housing 1111 by distance L1. According to the movement of the second housing 1112, an area exposed to outside of the electronic device 1100 may be extended in the display 1120.

According to an embodiment, if the second value exceeds the second reference value, the electronic device 100 may display the first circle 1231 at a size greater than the third circle 1233. According to an embodiment, when the second value is equal to or greater than the second reference value, and the second input is removed, the electronic device 1100 may switch to a third state 1103 using the mechanized internal structure and/or driving unit. For example, if the second value is equal to the second reference value, the second housing 1112 may move away from the first housing 1111.

According to an embodiment, if the second value is equal to or greater than the second reference value, the electronic device 100 may display a third GUI on the display 1120.

Figure 13:
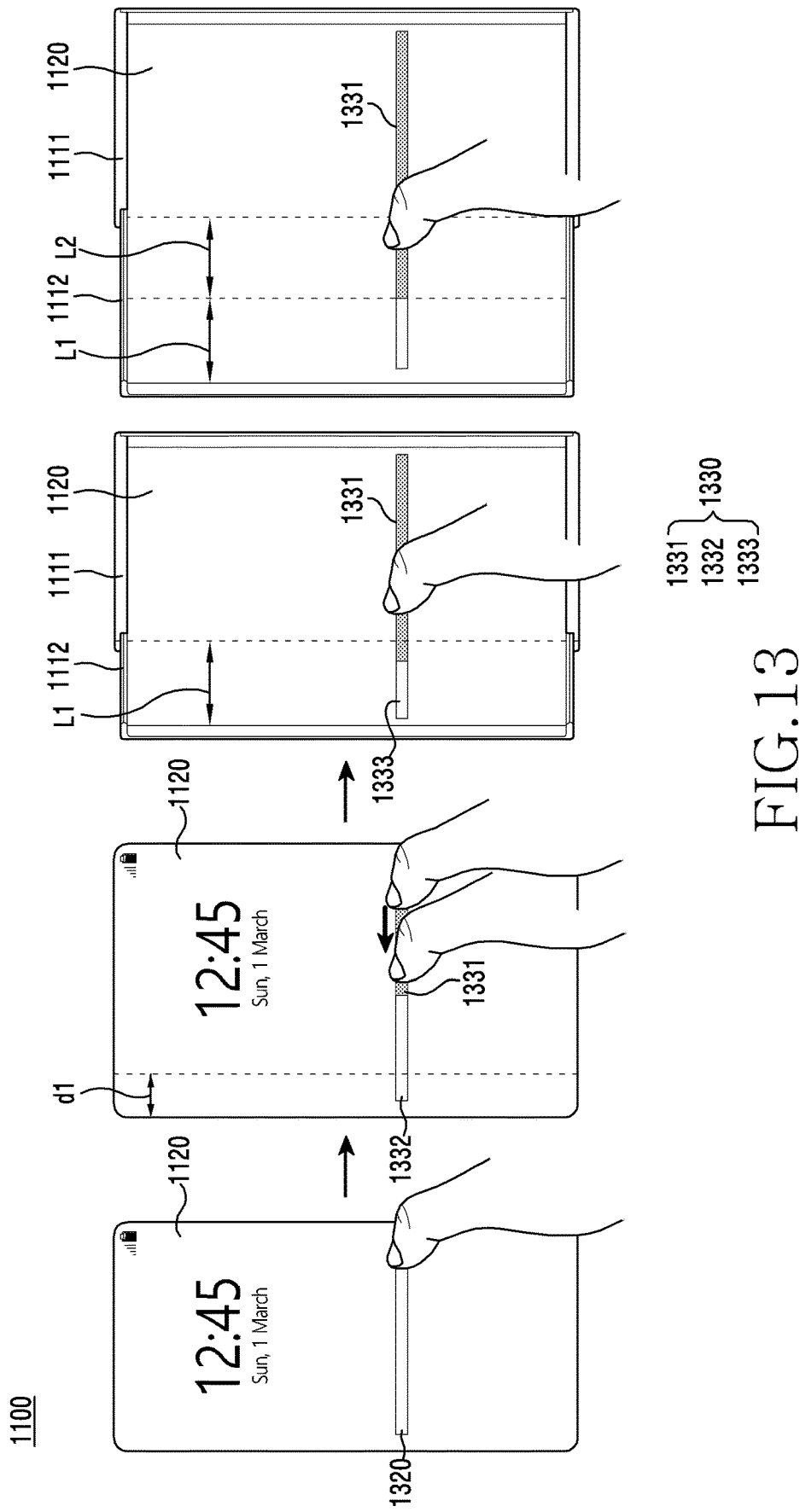
FIG. 13 is a view of an electronic device for displaying a stepwise bar-type interface in response to an input according to an embodiment.

FIG. 13 depicts an electronic device for displaying a stepwise bar-type interface in response to an input according to an embodiment.

Referring to FIG. 11 and FIG. 13 together, an electronic device 1100 according to an embodiment may include a first housing 1111, a second housing 1112 and a display 1120. The same reference numeral is used for the same or substantially the same component as described earlier, and redundant explanations are omitted.

According to an embodiment, the electronic device 1100 may detect a first input for the display 1120, using at least one sensor. According to an embodiment, if detecting a first input, the electronic device 1100 may display a UI 1320 for guiding a second input on the display 1120.

According to an embodiment, if detecting a second input following the first input, the electronic device 1100 may display a first bar-type GUI 1330 on the display 1120 based on the detected second input.

According to an embodiment, the first bar-type GUI 1330 may include a second region 1332 corresponding to a first reference value (e.g., prestored). According to an embodiment, the first bar-type GUI 1330 may include a third region 1333 corresponding to a second reference value (e.g., prestored). According to an embodiment, the first bar-type GUI 1330 may include a first region 1331 corresponding to a second value. For example, if a pressure of the second input increases, the first region 1331 may increase in response to the pressure value.

According to an embodiment, when the second value is equal to or greater than the first reference value and less than the second reference value, the electronic device 100 may display a second GUI on the display 1120. According to an embodiment, when the second value is equal to or greater than the first reference value and less than the second reference value, the second housing 1112 may move away from the first housing 1111. For example, when the second value is equal to the first reference value, the second housing 1112 may move away from the first housing 1111 by a distance L1.

According to an embodiment, when the second value is equal to or greater than the second reference value, the electronic device 1100 may display a third GUI on the display 1120. According to an embodiment, when the second value is equal to or greater than the second reference value, the second housing 1112 may move away from the first housing 1111. According to an embodiment, when the first region 1331 is equal to the third region 1333 in size, the second housing 1112 may move away from the first housing 1111. According to an embodiment, according to the movement of the second housing 1112, an area exposed to outside of the electronic device 1100 may be extended on the display 1120. According to an embodiment, the second housing 1112 may be moved in the same manner as the second housing 1112 of FIG. 12.

Figure 14:
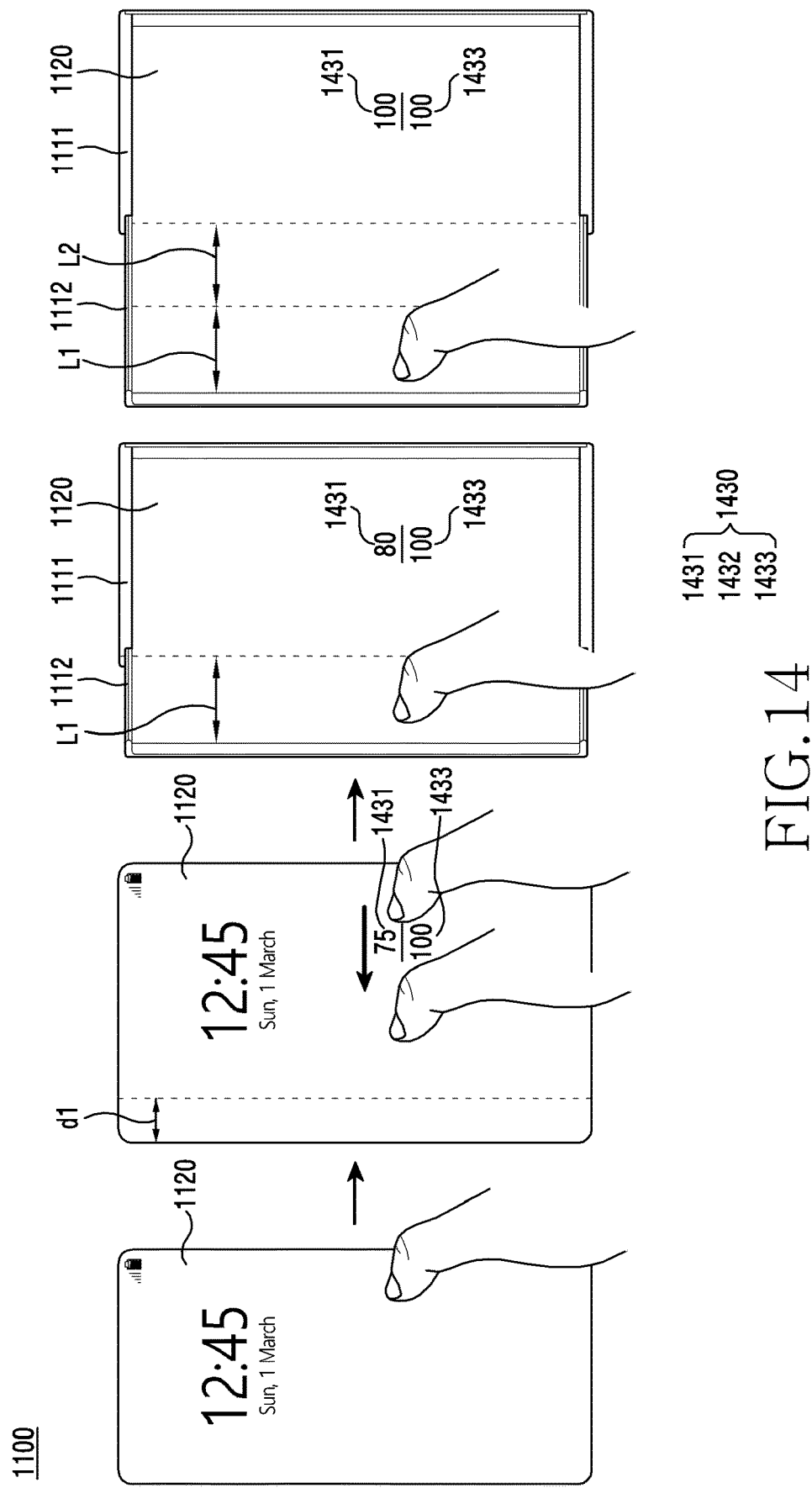
FIG. 14 is a view of an electronic device for displaying a stepwise number-type interface in response to an input according to an embodiment.

FIG. 14 depicts an electronic device for displaying a stepwise number-type interface in response to an input according to an embodiment.

Referring to FIG. 14, an electronic device 1100 according to an embodiment may include a first housing 1111, a second housing 1112 and a display 1120. The same/like reference numeral is used for the same or substantially the same component as described earlier, and redundant explanations are omitted.

The electronic device 1100 according to an embodiment may detect a first input and a second input for the display 1120, using at least one sensor. According to an embodiment, when detecting the second input, the electronic device 1100 may display a first number-type GUI 1430 on the display 1120. According to an embodiment, the first number-type type GUI 1430 nay be displayed at, near or proximate to a contact position of the second input on the display 1120.

According to an embodiment, the first number-type GUI 1430 may include a second value 1432 corresponding to a first reference value (e.g., a prestored value). According to an embodiment, the first number-type GUI 1430 may include a third value 1433 corresponding to a second reference value (e.g., prestored). Part of the above-mentioned configuration may be omitted (e.g., the second number 1432). According to an embodiment, the first number-type GUI 1430 may include a first value 1431 corresponding to a second value. For example, if a pressure of the second input increases, the first value 1431 may increase in response.

According to an embodiment, when the second value is equal to or greater than the first reference value, the electronic device 1100 may display a second GUI on the display 1120. According to an embodiment, when the second value is equal to or greater than the first reference value, the second housing 1112 may move away from the first housing 1111 by L1. According to an embodiment, according to the movement of the second housing 1112, an area exposed to outside of the electronic device 1100 may be extended for the display 1120.

According to an embodiment, if the second value is less than the first reference value, the electronic device 1100 may display the first number 1431 smaller than the second number 1432. When the second value is less than the first reference value, the second housing 1112 may move away from the first housing 1111 by a distance d1. According to an embodiment, when the second housing 1112 moves away from the first housing 1111 by d1 and the second input is removed, the electronic device 1100 may return to a first state 1101 by means of the mechanized internal structure and/or driving unit.

According to an embodiment, if the second value is equal to or greater than the second reference value, the electronic device 1100 may display the first number 1431 greater than the third number 1433. According to an embodiment, if the second value is equal to or greater than the second reference value and the second input is removed, the electronic device 1100 may switch to a third state 1103 by means of its internal structure or driving unit. For example, if the second value is equal to the second reference value, the second housing 1112 may move away from the first housing 1111.

Figure 15:
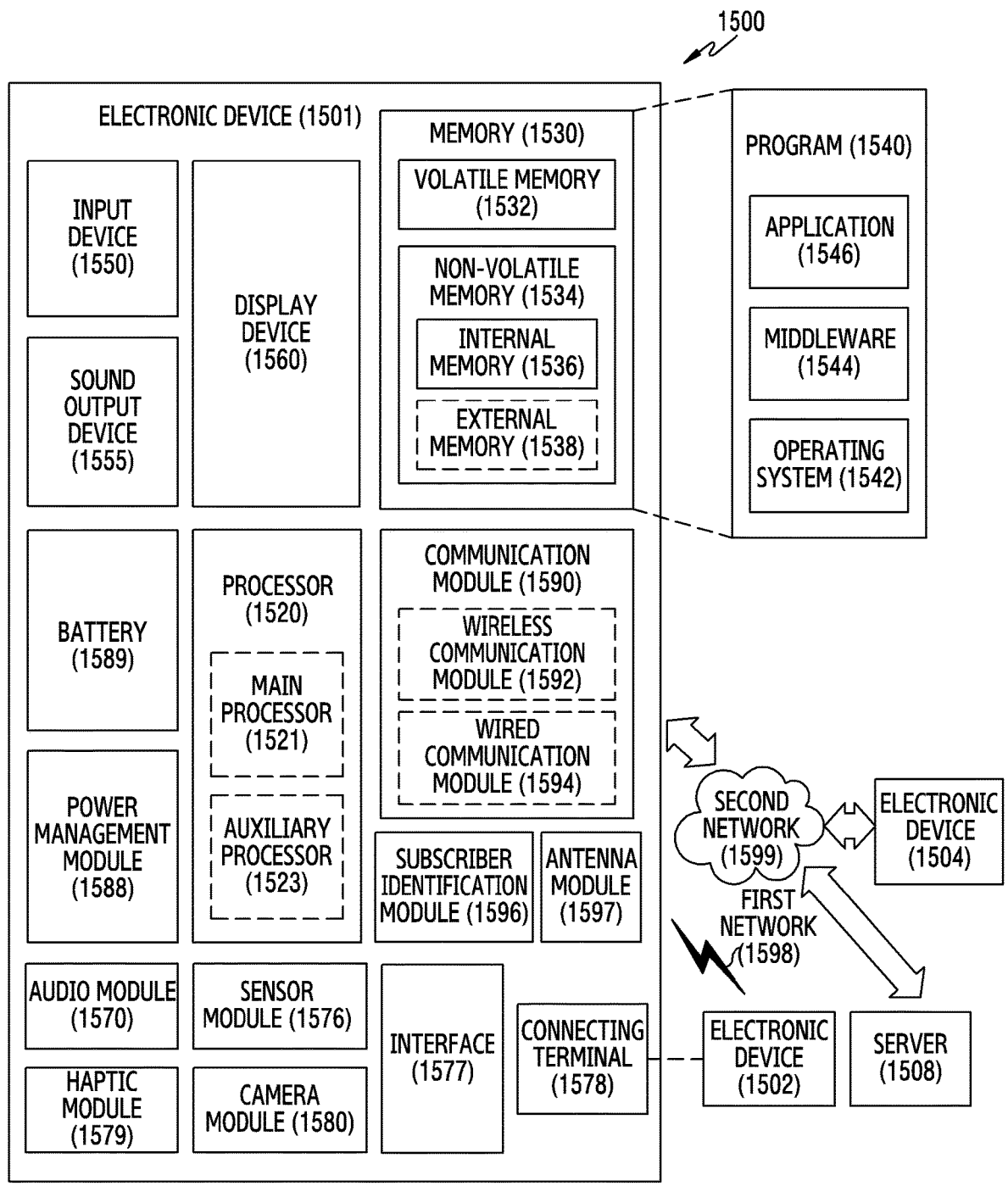
FIG. 15 is a block diagram of an electronic device in a network environment, according to an embodiment.

FIG. 15 is a block diagram illustrating an electronic device 1501 in a network environment 1500 according to certain embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thererto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element implemented using a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to certain embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device according to an embodiment may include a housing including a first housing, and a second housing movable with respect to the first housing and coupled to the first housing, a flexible display coupled with the housing, and extending or reducing a display area exposed to outside in at least one direction according to a movement of the second housing, a sensor for detecting an input for the flexible display and at least one processor, such that the sensor may be configured to detect a first input for the flexible display, and the at least one processor may be configured to obtain a first value from the first input, if the first value is equal to or greater than a first reference value (e.g., predesignated), detect a second input following the first input, using the sensor, display a first GUI in response to the second input, and obtain a second value from the second input, and while the second value is less than a second reference value, display the first GUI based on the second value.

According to an embodiment, if the second value is equal to or greater than the second reference value, a second GUI may be displayed on the flexible display, and the display area may be extended by moving the second housing.

According to an embodiment, the first GUI may include a first circle corresponding to the second reference value and a second circle displayed inside the first circle, and as the second value increases, a size of the second circle may increase.

According to an embodiment, the first GUI may include a bar graph, the bar graph including a first region corresponding to the second reference value and a second region distinguished from the first region, and as the second value increases, a ratio of the second region to the first region may increase.

According to an embodiment, the at least one processor may be configured to control the flexible display to change and display a color of an object in the first GUI according to a change of the second value.

According to an embodiment, the first GUI may include a first number indicating the second reference value and a second number indicating the second value.

According to an embodiment, the electronic device may further include a driving unit, and the driving unit may be configured to, if the second value is equal to or greater than the second reference value, extend the display area by moving the second housing from a first position to a third position with respect to the first housing, and if a pressure less than the second reference value is applied, move the second housing from the first position to a second position with respect to the first housing, and move the second housing from the second position to the first position with respect to the first housing as the pressure is removed.

According to an embodiment, the at least one processor may be configured to compare the second value with a third reference value (e.g., prestored), based on the comparison result, if the second value is equal to or greater than the second reference value and less than the third reference value, display the second GUI on the flexible display, and if the second value is equal to or greater than the third reference value, display a third GUI on the flexible display.

A method of operating an electronic device according to an embodiment may include detecting a first input for a flexible display through a sensor, obtaining a first value from the first input, if the first value is equal to or greater than a first reference value (e.g., predesignated), detecting a second input following the first input, using the sensor, displaying a first GUI in response to the second input, obtaining a second value from the second input, while the second value is less than a second reference value, displaying the first GUI on the display based on the second value, and if the second value is equal to or greater than the second reference value, displaying a second GUI on the flexible display, and extending an exposed area of the display.

According to an embodiment, the first GUI may include a first circle corresponding to the second reference value and a second circle displayed inside the first circle, and as the second value increases, a size of the second circle may increase.

According to an embodiment, the first GUI may include a bar graph, the bar graph including a first region corresponding to the second reference value and a second region distinguished from the first region, and as the second value increases, a ratio of the second region to the first region may increase.

According to an embodiment, the method may further include changing a color of an object in the first GUI according to a change of the second value.

According to an embodiment, the first GUI may include a first number indicating the second reference value and a second number distinguished from first number, and the method may further include, as the second value increases, increasing the second number.

According to an embodiment, the method may include comparing the second value with a third reference value (e.g., prestored), based on the comparison result, if the second value is equal to or greater than the second reference value and less than the third reference value, displaying the second GUI on the display, and if the second value is equal to or greater than the third reference value, displaying a third GUI on the display.

According to an embodiment, the method may further include, if the second value is equal to or greater than the second reference value, displaying a second GUI on the display.

An electronic device according to an embodiment may include a flexible display extending or reducing a display area exposed to outside of the electronic device in at least one direction, a sensor for detecting an input for the flexible display and at least one processor, such that the at least one processor may be configured to detect a first input for the flexible display, obtain a first value from the first input, if the first value is equal to or greater than a first reference value (e.g., predesignated), detect a second input following the first input, using the sensor, display a first GUI in response to the second input, and obtain a second value from the second input, and while the second value is less than a second reference value, display the first GUI based on the second value.

According to an embodiment, the at least one processor may generate first vibrations if the second value is less than the second reference value, and generate second vibrations stronger than the first vibrations if the detected pressure is equal to or greater than the second reference value.

According to an embodiment, the at least one processor may play a first sound if the second value is less than the second reference value, and play a second sound louder than the first sound if the detected pressure is equal to or greater than the second reference value.

According to an embodiment, if the second value is equal to or greater than the second reference value, the display area may be extended by moving at least part of a housing.

According to an embodiment, the at least one processor may be configured to compare the detected pressure with the second reference value (e.g., prestored), generate second vibrations if the detected pressure is equal to or greater than the first reference value and less than the second reference value based on the comparison result, and generate third vibrations if the detected pressure is equal to or greater than the second reference value.

According to certain embodiments of the disclosure, an electronic device of a slidable structure may intuitively provide a user with a strength or a distance for changing its structure.

In addition, by providing various graphical elements for information provision, user experience may improve in changing a structure of an electronic device.

What is claimed is:

1. An electronic device, comprising:
 a housing including a first sub-housing, and a second sub-housing movable with respect to the first sub-housing and coupled to the first sub-housing;
 a flexible display coupled with the housing, movable to expand or reduce an exposed display area of the flexible display according to a movement of the second sub-housing;
 at least one sensor; and
 at least one processor, configured to:
  detect a first input for the flexible display via the at least one sensor and obtain a first value based on the first input,
  when the first value is equal to or greater than a first reference value, detect a second input after the first input using the at least one sensor,
  obtain a second value corresponding to the second input and display a first graphical user interface (GUI) element visually changing according to the second value,
  while the second value is less than a second reference value, display the first GUI element corresponding to the second value, and cause the second sub-housing to move to extend the exposed display area by a first distance, and
  while the second value is equal to or greater than the second reference value, display a second GUI element on the flexible display, and cause the second sub-housing to move to extend the exposed display area by a second distance greater than the first distance,
 wherein, if the second input is released while the second value is less than the second reference value, the at least one processor is configured to cause the second sub-housing to move to reduce the extended exposed display area.

2. The electronic device of claim 1, wherein the first GUI element includes a first circle corresponding to the second reference value, and a second circle displayed inside the first circle, and
 wherein as the second value increases, a size of the second circle increases,
 and
 wherein, after extending the exposed display area by the first distance, if the second input is released while the second value is equal to or greater than the second reference value, the at least one processor is configured to cause the second sub-housing to move to extend the exposed display area to the second distance from the first distance in absence of maintenance of the second input.

3. The electronic device of claim 1, wherein the first GUI element includes a bar graph, the bar graph including a first region corresponding to the second reference value, and a second region distinct from the first region, and
 wherein as the second value increases, a display ratio of the second region to the first region increases within the bar graph.

4. The electronic device of claim 1, wherein an object in the first GUI element changes in color according to changes in the second value.

5. The electronic device of claim 1, wherein the first GUI element includes display of a first number indicating the second reference value, and display of a second number indicating the second value.

6. The electronic device of claim 1, further comprising:
 a driving unit,
 wherein the at least one processor is further configured to:
  based on detecting that the second value is equal to or greater than the second reference value, control the driving unit to extend the display area by moving the second sub-housing from a first position to a third position with respect to the first sub-housing,
  based on detecting that an applied pressure of the second input is less than the second reference value, control the driving unit to move the second sub-housing from the first position to a second position with respect to the first sub-housing, and
  based on detecting removal of the applied pressure, control the driving unit to move the second sub-housing from the second position to the first position with respect to the first sub-housing as the applied pressure is removed.

7. The electronic device of claim 1, wherein the at least one processor is configured to,
 compare the second value with a third reference value,
 based on detecting the second value is equal to or greater than the second reference value and less than the third reference value, display the second GUI element on the flexible display, and
 based on detecting the second value is equal to or greater than the third reference value, display a third GUI element on the flexible display.

8. A method of operating an electronic device including a first and second housing, comprising:
 detecting a first input for a flexible display via at least one sensor;
 obtaining a first value from the first input;
 based on detecting, by at least one processor, the first value is equal to or greater than a first reference value, detecting a second input following the first input, using the at least one sensor;
 obtaining a second value corresponding to the second input and displaying a first graphical user interface (GUI) element visually changing according to the second value;
 while the second value is less than a second reference value, displaying the first GUI element on the display corresponding to the second value, and causing the second housing to move relative to the first housing to extend a display area of the flexible display by a first distance; and while the second value is equal to or greater than the second reference value, displaying a second GUI element on the flexible display, and causing the second housing to move relative to the first housing to extend the display area of the flexible display by a second distance greater than the first distance, wherein, if the second input is released while the second value is less than the second reference value, causing the second housing to move to reduce the extended display area.

9. The method of claim 8, wherein the first GUI element includes a first circle corresponding to the second reference value, and a second circle displayed inside the first circle, and wherein as the second value increases, a size of the second circle increases, and wherein, after extending the display area by the first distance, if the second input is released while the second value is equal to or greater than the second reference value, causing the second housing to move to extend the display area to the second distance from the first distance in absence of maintenance of the second input.

10. The method of claim 8, wherein the first GUI element includes a bar graph, the bar graph including a first region corresponding to the second reference value and a second region distinct from the first region, and wherein as the second value increases, a display ratio of the second region to the first region increases within the bar graph.

11. The method of claim 8, wherein an object in the first GUI element changes in color according to changes in the second value.

12. The method of claim 8, wherein the first GUI element includes a first display of a first number indicating the second reference value, and display of a second number distinct from first number, and wherein as the second value increases, the second number increases in count.

13. The method of claim 8, further comprising:

comparing the second value with a third reference value;

based on detecting the second value is equal to or greater than the second reference value and less than the third reference value, displaying the second GUI element on the display; and based on detecting the second value is equal to or greater than the third reference value, displaying a third GUI element on the display.

14. An electronic device, comprising:

a flexible display that is movable to expand or reduce an exposed display area of the flexible display, according to movement of a portion of a housing;

at least one sensor; and at least one processor, configured to:

detect a first input for the flexible display via the at least one sensor and obtain a first value based on the first input, when the first value is equal to or greater than a first reference value, detect a second input following the first input via the at least one sensor, obtain a second value corresponding to the second input and display a first graphical user interface (GUI) element visually changing according to the second value, while the second value is less than a second reference value, display the first GUI element corresponding to the second value, and cause the portion of the housing to move to extend the exposed display area of the flexible display by a first distance, and while the second value is equal to or greater than the second reference value, display a second GUI element on the flexible display, and cause the portion of the housing to move to extend the exposed display area of the flexible display by a second distance greater than the first distance, wherein, if the second input is released while the second value is less than the second reference value, the at least one processor is configured to cause the portion of the housing to move to reduce the extended exposed display area.

15. The electronic device of claim 14, further comprising a haptic motor, wherein the at least one processor is further configured to:

control the haptic motor to generate a first vibration intensity if the second value is less than the second reference value, and generate a second vibration intensity stronger than the first vibration intensity if a detected pressure of the second input is equal to or greater than the second reference value.

16. The electronic device of claim 15, further comprising a speaker, wherein the at least one processor is further configured to:

output, via the speaker, a first sound based on detecting the second value is less than the second reference value, and output a second sound louder than the first sound based on detecting the detected pressure is equal to or greater than the second reference value.

17. The electronic device of claim 15, further comprising a haptic motor, wherein the at least one processor is configured to:

compare the detected pressure with the second reference value, control the haptic motor to generate second vibration intensity based on detecting the detected pressure is equal to or greater than the first reference value and less than the second reference value based on the comparison result, and control the haptic motor to generate third vibration intensity stronger than the first vibration intensity, if the detected pressure is equal to or greater than the second reference value.

\* \* \* \* \*